(12) United States Patent
Schmeyer et al.

(10) Patent No.: US 7,933,841 B2
(45) Date of Patent: Apr. 26, 2011

(54) SYSTEM AND METHOD FOR PROVIDING CONSUMER REWARDS

(75) Inventors: Frank F. Schmeyer, Boca Raton, FL (US); Mario A. Cruz, Miami, FL (US)

(73) Assignee: Rewards Network, Inc., Chicago, IL (US)

( * ) Notice: Subject to any disclaimer, the term of this patent is extended or adjusted under 35 U.S.C. 154(b) by 87 days.

(21) Appl. No.: 12/184,395

(22) Filed: Aug. 1, 2008

(65) Prior Publication Data

US 2009/0063351 A1 Mar. 5, 2009

Related U.S. Application Data

(63) Continuation of application No. 10/788,495, filed on Feb. 27, 2004, now abandoned, which is a continuation-in-part of application No. 09/802,082, filed on Mar. 8, 2001, now abandoned.

(60) Provisional application No. 60/221,468, filed on Jul. 26, 2000.

(51) Int. Cl.
*G06Q 20/00* (2006.01)
*G06Q 30/00* (2006.01)
(52) U.S. Cl. ............... 705/64; 705/14.27; 705/14.36
(58) Field of Classification Search .......... 705/1–45, 705/50–79
See application file for complete search history.

(56) References Cited

U.S. PATENT DOCUMENTS

| | | | |
|---|---|---|---|
| 4,360,872 A | 11/1982 | Suzuki et al. | |
| 4,594,663 A | 6/1986 | Nagata et al. | |
| 4,638,312 A | 1/1987 | Quinn et al. | |
| 4,669,730 A | 6/1987 | Small | |
| 4,673,802 A | 6/1987 | Ohmae et al. | |
| 4,722,054 A | 1/1988 | Yorozu et al. | |
| 4,723,212 A | 2/1988 | Mindrum et al. | |
| 4,750,119 A | 6/1988 | Cohen et al. | |

(Continued)

FOREIGN PATENT DOCUMENTS

EP 0308224 A2 3/1989

(Continued)

OTHER PUBLICATIONS

Lance Spitzner, what is MD5 and Why do I Care?, MD5-One-Way Hash Algorithim, Sep. 1, 2004, http://www.spitzner.net/md5/ht ml.

(Continued)

*Primary Examiner* — Andrew J. Fischer
*Assistant Examiner* — Murali Dega
(74) *Attorney, Agent, or Firm* — Neal, Gerber, Eisenberg LLP

(57) ABSTRACT

An automated consumer rewards/incentive program that accepts a registration of a consumer. The registration entitles the consumer to receive the benefits of the incentive program. To track the fulfillment of reward earning criteria established by member businesses, the registration includes information indicative of a credit card of the consumer. The system may track member consumer credit card transactions without receiving personal information for non-members by using a one way hash function. The system uses the credit card information to determine when member customers perform a transaction at a member business. When a member customer performs a transaction at a member business using the registered credit card, the system and method examines the credit card transactional information to determine if the consumer fulfilled the requirements of the incentive program for the member business. If the transactional information indicates that the consumer fulfilled the criteria of the rewards program of the member business, the consumer is rewarded in accordance with the benefits of the incentive program.

12 Claims, 19 Drawing Sheets

U.S. PATENT DOCUMENTS

| | | | |
|---|---|---|---|
| 4,941,090 A | | 7/1990 | McCarthy |
| 5,003,472 A | | 3/1991 | Perrill et al. |
| 5,025,372 A | | 6/1991 | Burton et al. |
| 5,117,355 A | | 5/1992 | McCarthy |
| 5,202,826 A | | 4/1993 | McCarthy |
| 5,287,268 A | | 2/1994 | McCarthy |
| 5,459,306 A | | 10/1995 | Stein et al. |
| 5,708,780 A | | 1/1998 | Levergood |
| 5,715,314 A | | 2/1998 | Payne et al. |
| 5,724,424 A | | 3/1998 | Gifford |
| 5,761,648 A | | 6/1998 | Golden et al. |
| 5,774,870 A | | 6/1998 | Storey |
| 5,794,210 A | | 8/1998 | Goldhaber et al. |
| RE36,116 E | | 2/1999 | McCarthy |
| 5,893,075 A | * | 4/1999 | Plainfield et al. ......... 705/14.67 |
| 6,009,412 A | * | 12/1999 | Storey ................. 705/14.27 |
| 6,012,635 A | | 1/2000 | Shimada et al. |
| 6,026,370 A | * | 2/2000 | Jermyn ................. 705/14.41 |
| 6,049,778 A | | 4/2000 | Walker et al. |
| 6,061,660 A | * | 5/2000 | Eggleston et al. ......... 705/14.12 |
| 6,119,933 A | * | 9/2000 | Wong et al. ................. 235/380 |
| 6,128,599 A | | 10/2000 | Walker et al. |
| 6,138,911 A | | 10/2000 | Fredregill et al. |
| 6,144,948 A | * | 11/2000 | Walker et al. ................. 705/38 |
| 6,298,330 B1 | * | 10/2001 | Gardenswartz et al. ... 705/14.25 |
| 6,327,573 B1 | * | 12/2001 | Walker et al. ............. 705/14.36 |
| 6,345,261 B1 | * | 2/2002 | Feidelson et al. ......... 705/14.18 |
| 6,584,450 B1 | | 6/2003 | Hastings et al. |
| 6,741,969 B1 | | 5/2004 | Chen et al. |
| 6,915,271 B1 | * | 7/2005 | Meyer et al. ............... 705/14.35 |
| 2008/0249813 A1 | | 10/2008 | Schmeyer |

FOREIGN PATENT DOCUMENTS

| | | |
|---|---|---|
| GB | 2308474 A | 6/1997 |
| GB | 2345775 A | 7/2000 |
| JP | 5547560 | 4/1980 |
| WO | WO 95/12175 | 5/1995 |
| WO | WO 00/14665 | 3/2000 |

OTHER PUBLICATIONS

Chapter 3: One-Way Hash Function, Sep. 1, 2004, http://www.aspencrypt.com/cry pto101_hash.html.

One-Way Hash Function, Nov. 20, 2003, http://www.webopedia.com/TE RM/O/one-way_hash_function.html.

One-Way Hash Function, Nov. 20, 2003, http://www.hyperdictionary.com/computing/one-way+hash+function.

3.6.6 What Are MD2, MD4, and MD5?, Nov. 20, 2003, http://www.rsasecurity.com/rsalabs/faq/3-6-6/html.

U.S. Non-Published U.S. Appl. No. 09/461,336 as cited on Sep. 28, 2004 with regards to U.S. Publication No. 2008/249813.

Defendant's Motion For Summary Judgment of Non-Infringement Pursuant to 35 U.S.C. §273, or, in the Alternative, For Summary Judgment of Patent Invalidity Based Upon the on Sale Bar dated Jan. 30, 2006 with respect to Civil Action No. 2-04-CV-347, *Source, Inc.* v. *Rewards Network, Inc.* and Rewards Network Inc. and *RTR Funding LLC* v. *Source, Inc.*

Exhibits 1-22 from Defendant's Motion For Summary Judgment of Non-Infringement Pursuant to 35 U.S.C. §273, or, in the Alternative, For Summary Judgment of Patent Invalidity Based Upon the on Sale Bar dated Jan. 30, 2006 with respect to Civil Action No. 2-04-CV-347, *Source, Inc.* v. *Rewards Network, Inc.* and *Rewards Network Inc. and RTR Funding LLC* v. *Source, Inc.*

Volume I of the videotaped deposition of Mario Cruz taken on Mar. 2, 2006 with respect to Civil Action No. 2-04-CV-347, *Source, Inc.* v. *Rewards Network, Inc.*

Exhibits 8-13 and 23-24 from vol. I of the videotaped deposition of Mario Cruz taken on Mar. 2, 2006 with respect to Civil Action No. 2-04-CV-347, *Source, Inc.* v. *Rewards Network, Inc.*

Volume II of the videotaped deposition of Mario Cruz taken on Mar. 3, 2006 with respect to Civil Action No. 2-04-CV-347, *Source, Inc.* v. *Rewards Network, Inc. and Rewards Network Incorporated and RTR Funding LLC* v. *Source, Incorporated.*

Defendants' Motion for Partial Summary Judgment of patent Invalidity and Incorporated Memorandum in Support dated Mar. 12, 2007 with respect to Cause No. 6:05-CV-424 (LED)-(JDL), *Advanceme, Inc.* v. *RapdiPay, LLC, et al.*

Expert Report of Donald Headlund dated Mar. 7, 2007 with respect to Cause No. 6:05-CV-424 (LED)-(JDL), *Advanceme, Inc.* v. *RapdiPay, LLC, et al.*

Deposition of Melvin Chasen taken on Jul. 12, 2007 with respect to C.A. No. 6:06-CV-082LED-JDL, *Advanceme, Inc.* v. *RapdiPay, LLC, et al. and Advanceme, Inc.*, v. *Amerimerchant, LLC.*

Memorandum Opinion and Order dated Aug. 14, 2007 with respect to Cae No. 6:05-CV-424 *Advanceme, Inc.* v. *RapdiPay, LLC, et al.*

* cited by examiner

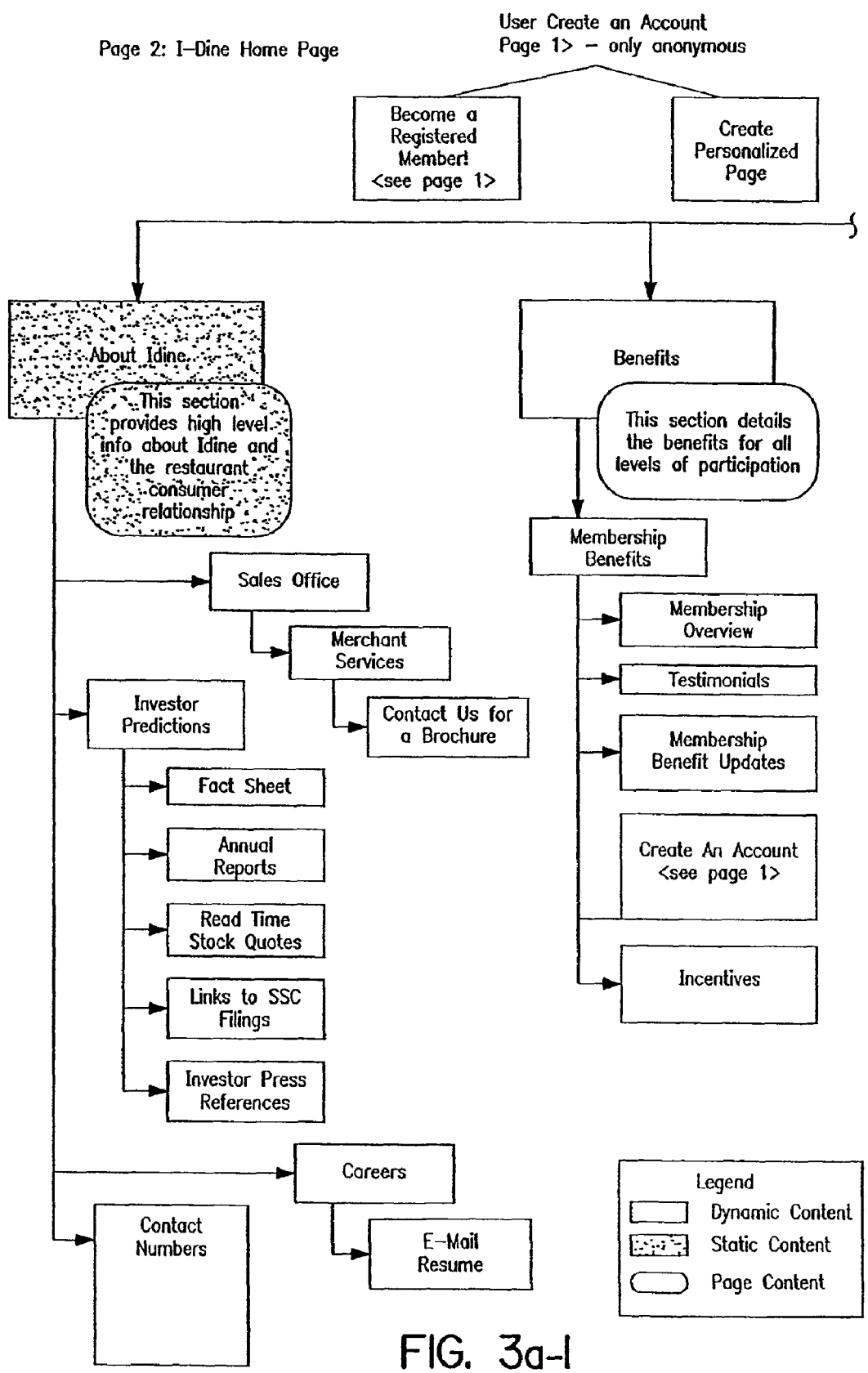
FIG. 3a-I

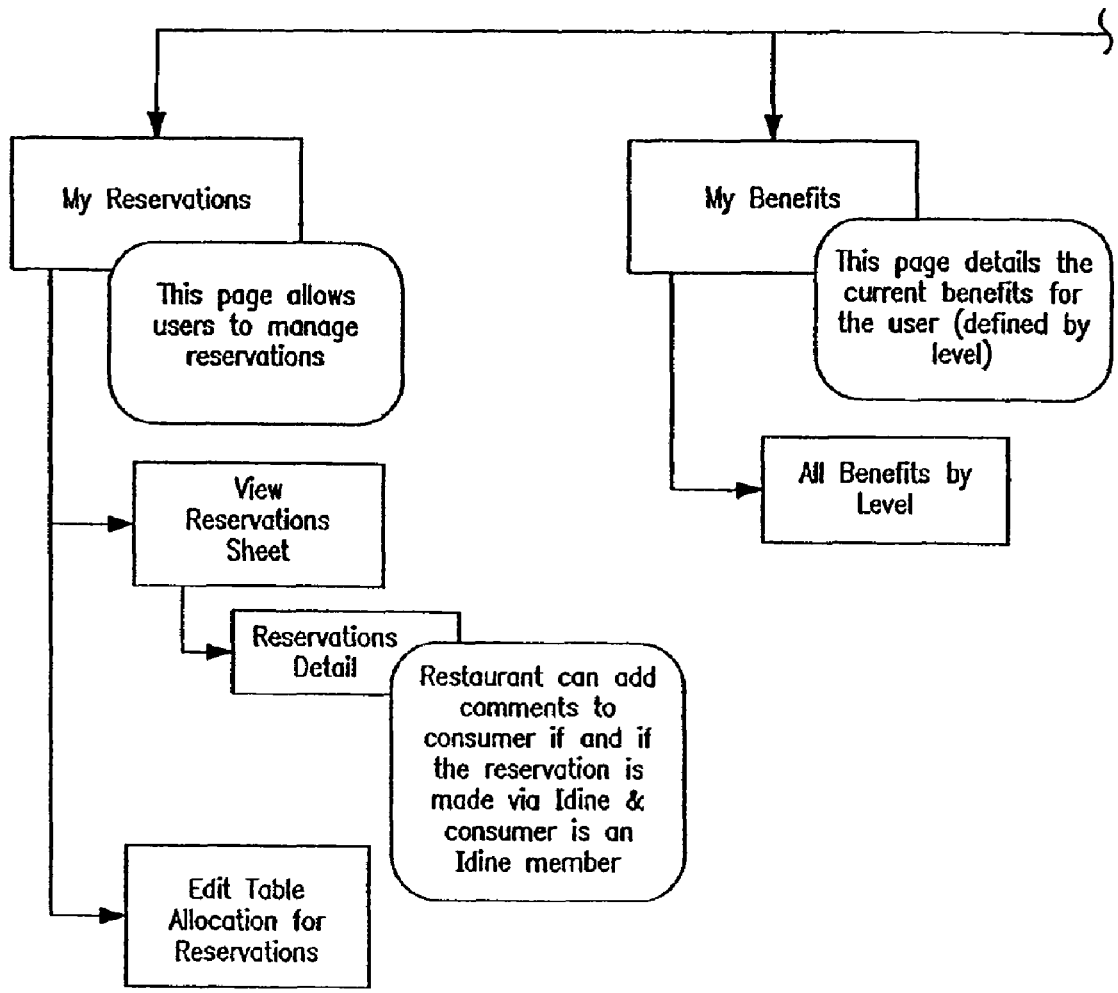
FIG. 3e-1
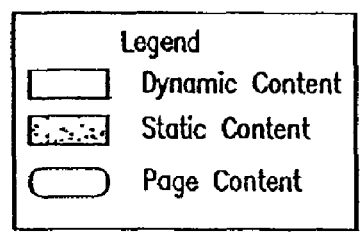

SYSTEM AND METHOD FOR PROVIDING CONSUMER REWARDS

RELATED APPLICATION

This application is a continuation of U.S. patent application Ser. No. 10/788,495 filed on Feb. 27, 2004, which is a continuation-in-part of U.S. patent application Ser. No. 09/802,082 filed on Mar. 8, 2001, which claims the benefit of U.S. Provisional Patent Application Ser. No. 60/221,468 filed on Jul. 26, 2000. These prior applications are incorporated herein by reference in their entirety.

BACKGROUND OF THE INVENTION

This invention relates generally to consumer reward or incentive programs and, more specifically, to a system and method for providing an automated consumer reward program.

In the prior art, various consumer reward programs are known. For example, the airline industry allows a consumer to make a plane reservation and to specify a frequent flyer number that is specific to the airline for which the reservation is made. In this manner, when the reservation is fulfilled by the consumer taking the reserved flight, the consumer is rewarded with redeemable frequent flyer miles. Such reservations can be made using a network, for example, the Internet, by phone, etc.

By way of further example, it is also known in the restaurant industry to provide a means by which consumers can make dining reservations and benefit from a rewards program. In this regard, reservations can be made via access to a Web site, such as www.opentable.com. Reservations made through "OpenTable" allow a consumer to earn "OpenTable points" that are redeemable for rewards. To earn the points, the consumer must arrive at the restaurant before or at the reservation time and check in with the restaurateur who will then notify "OpenTable" of the reservation fulfillment. If the consumer fails to check in with the restaurateur, the consumer must mail a copy of the dining receipt to "OpenTable" within three months to notify "OpenTable" of the reservation fulfillment. For this service the restaurateur is charged a fee.

While the described systems work for their intended purpose, they do suffer various disadvantages. For example, the currently implemented airline consumer reward program requires the consumer to remember their appropriate frequent flyer number. Meanwhile, the on-line reservation system of "OpenTable" requires the performance of some action by either the consumer or the restaurateur (beyond actual fulfillment of the reservation) to ensure the awarding of rewards. Accordingly, a need exists for an improved system and method for providing consumers rewards.

SUMMARY OF THE INVENTION

In accordance with this need, the subject invention provides an automated consumer rewards/incentive program that requires minimal human intervention and which is substantially transparent to the consumer and to the business owner. To this end, the subject system and method accepts a registration of a consumer that entitles the consumer to receive the benefits of the incentive program. To track the fulfillment of reward earning criteria established by member businesses, the registration includes information indicative of a credit card of the consumer. The system uses the credit card information to determine when member customers perform a transaction at a member business. When a member customer performs a transaction at a member business using the registered credit card, the system and method examines the credit card transactional information to determine if the consumer fulfilled the requirements of the incentive program for the member business, e.g., purchased goods/services from a member business, fulfilled a reservation at a member business, etc. If the transactional information indicates that the consumer fulfilled the criteria of the rewards program of the member business, the consumer is rewarded in accordance with the benefits of the incentive program. The system and method also tracks and communicates information to members and business such as, for example, accumulated rewards, summaries of transactions and balances.

In a further embodiment of the invention, the system may be implemented on-line to leverage the functionality of the Internet. In this manner, the system provides a versatile tool for meeting a variety of needs of both consumers and businesses. For example, a business can use the Internet to change information in real-time using an online connection with the system.

In yet a further embodiment of the invention, the system may track member consumer credit card transactions without receiving personal information for non-members by using a one-way hash function.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
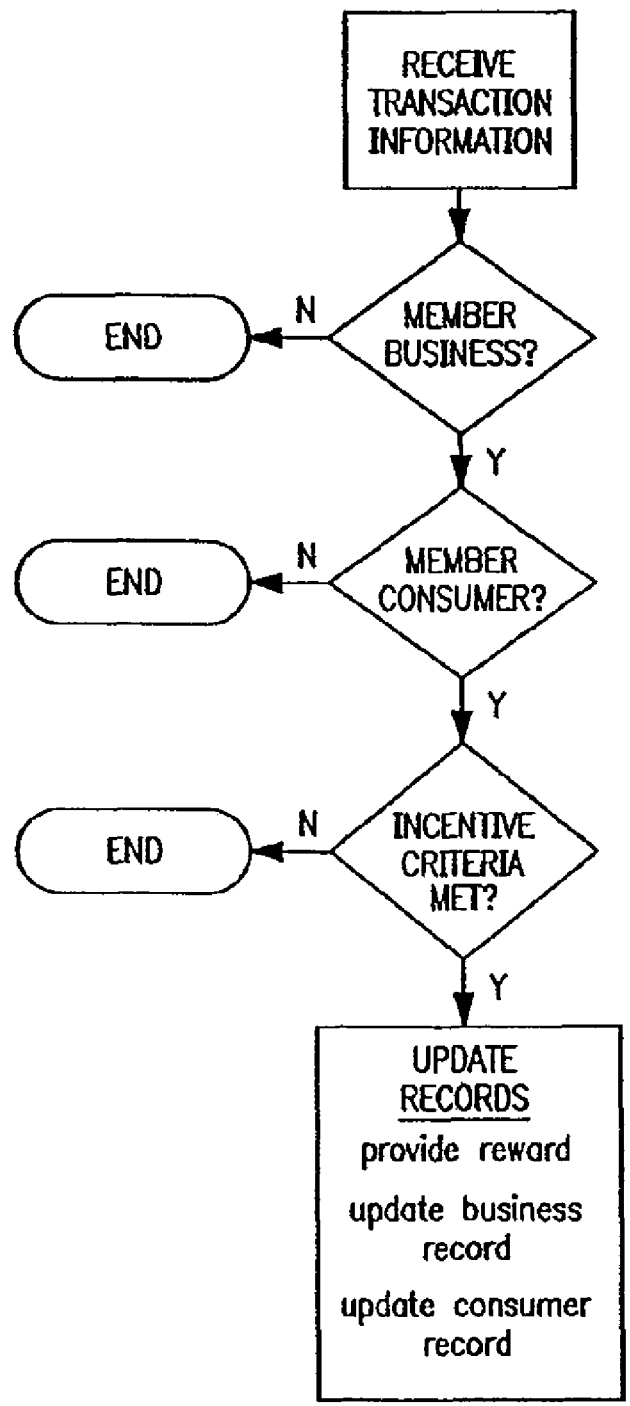
FIG. 1 illustrates a flow chart diagram of a system for determining consumer awards in accordance with the subject invention.

Turning now to the figures, wherein like reference numerals refer to like elements, there is illustrated a system and method for providing consumer rewards. While the invention is particularly described in the context of the restaurant business, it is to be understood that this description is exemplary only and is not meant to be limiting. As will be described in greater detail hereinafter, the subject system and method generally functions by capturing and processing credit card transactions originating from restaurants to thereby generate rebates and rewards for member consumers. The system and method also maintains member restaurant information, maintains member consumer information, and maintains audit trails.

To become eligible to participate in the rewards program, both consumers and restaurants register to become members. Restaurant registration will include a credit card merchant number as well as the details of an awards program. Consumer registration will include a major credit card number. When the consumer uses the registered credit card at a member restaurant, all or part of the credit card transaction information, e.g., credit card number, merchant identification information, purchase amount, day of transaction, time of transaction, etc, is examined to determine if the member consumer has dined at the member restaurant and, if so, whether the member consumer has fulfilled the requirements of the incentive program of the member restaurant. In exchange for becoming a member restaurant, a restaurant can allow the plan provider to derive income from the proceeds of the credit card transaction.

To provide an automated system that essentially eliminates the need for human intervention, the credit card transactional information is subjected to a two-tier filtration process as illustrated in FIG. 1. In one step, credit card transactions are filtered to determine if a transaction took place at a member restaurant (e.g., by checking merchant identification numbers against a list of member merchant identification numbers). In another step, credit card transactions are filtered to determine if a transaction was made by a member consumer (e.g., by checking credit card numbers against a list of member consumer credit card numbers). The illustrated steps can occur in any order. If the credit card transactional information indicates that a member consumer purchased goods or services from the member restaurant, the remaining credit card transactional information can be examined to determine if the transaction fulfills the criteria for receiving awards as established by the member restaurant.

To transparently provide rewards to member consumers, the system may receive one or more daily files, which are comprised of credit card transaction information such as credit card numbers, transaction information and merchant identification numbers. In addition, the credit card transaction information may also include personal information for both member and non-member consumers associated with each of the underlying transactions. To comply with the existing and future state and federal privacy laws that pertain to medical, educational and financial information, such as Graham-Leach-Bliley and California State Bill 1386, and to maintain the confidentiality of personal information (as defined by applicable state and federal laws) for non-member consumers that may be included within the daily files, all or part of the personal information included within the daily file may be converted into unique transaction fingerprints by using a one-way hash function.

A one-way hash function is a mathematical algorithm that takes a variable-length message and produces a fixed-length fingerprint or hash, which is nearly impossible to reverse and unrecognizable. Moreover, if a one-way hash function is applied to the same variable-length message, it will always produce the same fingerprint. For example, if a one-way hash function is applied to a specific credit card number by computer A and the same one-way hash function is applied to the identical credit card number by computer B, each of the resulting fingerprints produced by computer A and computer B will be exact matches. Therefore, non-member credit card transaction information may be filtered out of the daily file by utilizing hashed representations of the personal information without actually providing recognizable or usable forms of the personal information to the system computer. Those with skill in the art will appreciate that the unique fingerprints may be of varying lengths, such as thirty-two bit or sixty-four bit strings, depending on the need for and availability of longer and more complex fingerprints.

More particularly, the one-way hash function may be applied to the personal information included within the daily file to produce unique transaction fingerprints, which are representative of the personal information for each of the respective transactions, before the daily file is sent to the system computer. Also, it should be understood by those with skill in the art that the daily file may include one or more types of personal information, such as a credit card number, a name or an address, and that the one-way hash function may be applied to each of these types of personal information separately or as a whole. Therefore, if the daily file provides the credit card transaction information in a database format, one or more columns in the daily file may be populated by transaction fingerprints. For example, the one-way hash could be applied to all or part of a credit card number. The same one-way hash function should also be applied to the identical personal information for member consumers that is stored by the system computer, which should have been entered into the system computer when the member consumer registered with the system and which is representative of personal information for member consumers only. Then, the system computer will compare the transaction fingerprints included in the daily file to the member fingerprints stored in the system computer. Any credit card transaction information associated with transaction fingerprints that do not match one of the member fingerprints stored in the system computer will be filtered out and discarded in accordance with the system requirements. Therefore, by applying the one-way hash function to personal information, the system is able to filter out non-member transaction information, without actually receiving personal information for the respective non-member consumer.

Although the preferred embodiment of the present invention compares hashed versions of personal information, it should be understood that the type of personal information that is used to filter out non-member transactions is not restrictive. Rather, it is only important that the type of information to which the one-way hash function is being applied be consistent between the daily file and the system computer. Thus, the hash function could be applied to information in the daily file, such as the name of the consumer, the credit card number or any other type of information that may serve as a unique consumer identifier, as long as it is applied to congruent information in the system computer, i.e., information that is of the same format and type.

Once the system filters out the non-member credit card transaction information, it can use a look-up table or similar methodology to generate the personal information for the corresponding member consumer. It should also be appreciated, however, that the system may apply the one-way hash function when the member consumer registers for the system and only use the unique member fingerprint throughout the filtering and qualification process. Once the system computer determines that it is dealing with member consumer credit card transaction information, the system will analyze the credit card transaction information to determine if the member consumer fulfilled the requirements of the incentive program for the member business; this is also referred to the qualification process. If the member consumer fulfills the requirements of the incentive program, the consumer is rewarded in accordance with the benefits of the incentive program. It should also be understood that the method of using a one-way hash function to filter out non-member information without the accessing any of the underlying confidential information may also be used in connection with the transfer of other information besides credit card information.

While not required, the system and method described hereinafter seeks to maximize the potential of a network, such as the Internet, to change the relationship between restaurants and their customers. This goal is particularly achieved by building a comprehensive, dependable, and useful network resource that links businesses and consumers with sophisticated interactive marketing, yield management, and customer relationship management capabilities. Both consumers and businesses will benefit from a centralized resource that combines unbiased information, an incentive program, and value-added activities such as online reservations, promotions, and/or auctions to facilitate and enhance the experience of the consumer.

Figure 2:
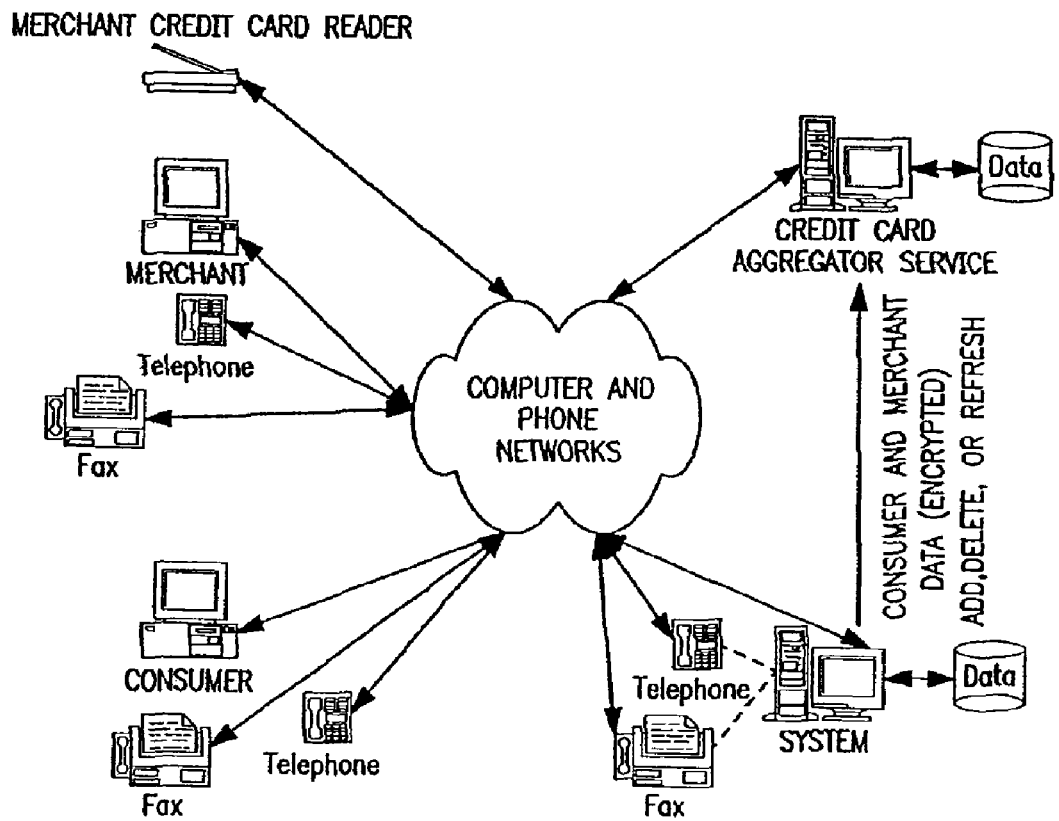
FIG. 2 illustrate a block diagram of an exemplary network in which the principles of the subject invention may be employed.

It will also be appreciated that various types of components can be utilized to achieve the objects of the subject invention. For example, while the invention is described as including the components illustrated in FIG. 2, namely, a consumer computer 10, a restaurant computer 12, a merchant credit card reader 14, a credit card aggregator service server and associated database 16, and the Web site/rewards processing/reservation taking, etc. system server and associated database 18, one of skill in the art will readily appreciate that other components and arrangements can be utilized. By way of example, while the operation of the invention is described in the general context of computer executable instructions, or program modules, being executed on the illustrated components, the tasks performed by these modules may also be performed by equivalent hardware. Still further, it is to be understood that the components illustrated in FIG. 2 are not intended to be limited to any particular type of computing device and may include hand-held devices, multiprocessor systems, microprocessor based or programmable consumer electronics, network PCs, minicomputers, mainframe computers, etc. With respect to the use of a network, the invention may be practiced in a distributed processing environment where tasks are performed by remote processing devices that are linked through a communications network. Alternatively, various of the components, such as the Web site system server and the credit card aggregator server, can be integrated on a single machine.

In accordance with the description that follows, the system and method will provide consumers with a one-stop shop approach to dining. Users will not only gain access to a trusted information resource on dining choices (listings, surveys, ratings, promotions) but also to a convenient tool for following through with their dining decisions by making reservations online. In addition, users will receive special incentives, such as discounts or points, when they dine at member restaurants. The trigger for awarding incentives will be transparent and accomplished via a registered credit card. The system and method may also be adapted to offer personalization, e.g., recommendations of restaurants based on past dining activities, etc., and premium member status.

To restaurants, the system and method is designed to become the dominant interactive partner. With a comprehensive focus on improving top and bottom lines of restaurants, the system and method will help restaurants move traditional marketing and promotional activity to the Internet and offer a completely new customer yield management tool, namely, variable dining incentives. This tool will enable restaurants to post variable incentives, discounts or dining points, to stimulate demand during off-peak periods.

During operation, there will be two different types of users of the system. One type of user will be the consumer, who will use the site to perform restaurant searches, make dining reservations, etc. The other type of user is the restaurant. The restaurant will use the site to manage their reservations, dining incentive offerings and table allocation.

To maximize the functionality of the system, the system is adapted to provide for different levels of use by consumers and restaurants. Examples of different levels of use may include:

Anonymous user—Can be either a consumer or a restaurateur. This user will not be recognized by the site but will be marketed to by offering different promotional opportunities to the user for increasing his level of participation on the site. This user can perform most functionality such as restaurant searches or reservations. However, this user will not have a "personalized" home page that will track the user's pending reservations and dining history and will not be able to take advantage of the incentives offered by the different restaurants.

Level 1 consumer—A level 1 user has accessed the system and has supplied the system with a name, e-mail address, zip code, user ID and password. This user will be acknowledged by the system and will have a "personalized" home page. The user will be able to use most all of the functionality offered by the site but will not be able to take advantage of the incentives offered by the different restaurants.

Level 2 consumer—A level 2 user has accessed the system and has agreed to all of the requirements of the system. The user has provided the system with his credit card information along with the necessary billing information, and the required information for a Level 1 consumer. A level 2 consumer will be able to take full advantage of the site's functionality including earning incentive points or dollars back by dining at participating restaurants. The level 2 consumer will have a "personalized" page that will track the user's pending reservations, the incentives that the consumer has registered for and any incentive points that the consumer has earned by dining.

Type 0 restaurant—This is a restaurant that has not signed up to be a member of the system and method but is nevertheless listed in the restaurant search results.

Type 1 restaurant—This is a restaurant that has signed up to be a member of the system and method interested only in editing its content page.

Type 2 restaurant—A restaurant that has signed up to be a member of the system and method interested only in online reservations exclusive of an incentives program.

Type 3 restaurant—A restaurant that has signed up to be a member of the system and method interested only in the incentives program exclusive of on-line reservations. Editable content regarding the restaurant will be available.

Type 4 restaurant—A restaurant that has signed up to be a member of the system and method interested in both on-line reservations and incentives. Editable content regarding the restaurant will be available.

Type 5 restaurant—a restaurant participating only in redemptions. The restaurant will accept member redemption at his restaurant but will not offer incentives.

When a user accesses the system via the Internet, without regard to their level of use, they will be given access to certain Web pages, retrieved from server 18, that may be tailored to meet the needs of the user.

With reference to FIGS. 3a-3e, illustrating a Web page site map for use in connection with the subject system and method, the following Web pages may be made available to the user:

"What's New"—This is an area that provides the users information about new features of the system site, and press releases from the public.

"Become a Registered Member"—This area will take the user to an area where he will enter personal account information in order to join the system. The preferred information that the system requests to move the user to a member is the user's name, email address, zip code, user ID, password, credit card number and billing information. From this screen the user does not have to enter all information to become a member, but in order to be recognized as even a Level 1 consumer the user must enter his name, email address, zip code, user ID, password, and password hint/answer.

"How iDine can bring the Restaurant and Consumer together"—This will be an area explaining to the consumer and the restaurant what the incentives program is and the benefits that are available to both the consumer and the restaurant.

"Benefits"—This area will detail to the user the benefits of joining the programs provided by the system. It reviews the different levels of membership for both the restaurant and the consumer, it will provide consumer/restaurant testimonials, and details about the ability for a member to purchase a dining gift for another person. There will also be a link on this page to get the consumer user to create an account with the system.

"Create a Personal Page"—This will be an area that is only available on the system home page to anonymous users. It will link the user to an area to enter account information, requiring the user's name, email address, zip code, user ID, password, and password hint/answer. By giving the system this information the anonymous user will be promoted to a Level 1 consumer and will be a recognized user of the site.

"I'm a Restaurant"—This area will link the user to an area that describes the benefits for a restaurant joining the programs provided by the system. It will also provide an area for the restaurant to request a visit from sales staff.

"Login"—This area of the screen will provide an opportunity for a user, either a consumer or restaurant, to log into the site as a valid user.

"Promotional Advertisement"—This will be an advertisement area that will make offers to users to join the system. An example of this would be "Just for visiting the site get 100 points. Click here for details on how to take advantage of this offer." The rotation of these promotions may occur per user session.

"Featured Restaurant"—The featured restaurant will be an advertisement for a member restaurant that is offering incentives to users that either are members or join the system. In the future it may also be incentives other than restaurant advertisements such as dinners with the chef and other opportunities. This restaurant may be picked to match as much of the consumer's profile information as possible. An example of this will be if the user is an anonymous user but has visited the site before and has given his city/zip code to the system, a cookie will store the last geographic area searched on and this information will be used to pick the featured restaurant that will be displayed.

"Make a Reservation"—The user will be able to make a reservation at a restaurant whether or not he is a member of system. This selection will take the user to an area to perform a search for a restaurant.

"Search for a Restaurant"—The user will be able to search for different restaurants based on the different user entered criteria.

"Help"—This section will provide the user with some frequently asked questions and answers, an overall site map, contact numbers and a way to contact customer service with either a comment or question.

"About"—This section will detail information about the system. It will cater to both the restaurant and consumer users of the site. It will provide the user a place to look at investor relation information, press releases, contact information, career opportunities available, and for the restaurants, information about having a sales representative contact them.

"Registered Incentives Advertisement"—This area of the screen will provide the user of the site with advertisements for restaurants. These advertisements will be for incentive participating restaurants that are offering incentives for member customers to register for.

It may be preferred that the site follow the consumer through the Web pages so that he/she has one-click access to the different opportunities.

To provide a secure login process for both consumers and restaurateurs, the system may check for a user ID and password and, if valid, will recognize the user with a personal page. The user's access to the different programs of the site will be determined by the restrictions on his/her login. If the user cannot remember his/her password then he/she can indicate this at the login screen and will be asked for a password hint. This password hint/answer should be a required field in the user's account. If the user has a password hint, the system will ask the user the hint question and, if the correct answer is given, a message is shown to the user that his/her password will be sent to the email address that is listed in the user's account.

When the anonymous user accesses the Web site he/she will be greeted by the home page that is described above. If the system knows that the user is a previous visitor of the site, for example by the use of a cookie, the system will display an advertisement to entice the user to become a member and try the programs provided by the system. Other than the advertisements, this is the only difference in the home page for each visit of the unregistered user to the site.

When a registered consumer logs into the site, there may be an option for the site to remember his/her password. If the consumer chooses to have the system remember their password the consumer will be recognized when returning to the site. Recognition may be accomplished with a greeting and tailored marketing, however, the user should still be required to give his/her password when trying to view any account information or history information. If the user does not want the site to remember his/her password, or does not set their browser accordingly, then, when the user access the Web site, he/she will be taken to the home page. From the home page the user will be able to log in and view their personalized content. If the user accessing the site is a restaurant, the user will be required to log into the site. Therefore, each time a restaurant access the system they will see the home page and will have to enter their password to access their personalized page. This is done for security purposes.

To manage all of the user's information, an account management module is provided. This module may manage each of the accounts in the database, both consumer and restaurant. It may also manage all of the user's information, including both profile and account information. To access the consumer or the restaurant account information the user must enter his/her password. This will occur even if the user has cookies enabled on his computer and has been recognized on the site.

To allow restaurants to be become members of the system, it is preferred that a restaurant be visited by the sales force and sign a contract indicating their level of membership. More specifically, there will be an area on the home page where the restaurants can access information about the programs provided by the system, enter some minor contact information about themselves, and request to be contacted by the sales department. This information will be returned to the system via e-mail. The creation of a restaurant account will be the responsibility of the sales force and customer service. However, once a restaurant is established as a member on the system, the restaurant may gain access to and change their account information via a visit to the Internet site. For example, using the Internet access provided by the system, the restaurant will be able to update their incentives and reservations information.

The sales representative will gather sales information about the restaurant and record this information. This information will be kept whether or not the restaurant signs up with the system. For member restaurants, after the initial account has been set up and entered into the database, the restaurant is given confirmation of their registration and verification of the restaurant's data in the database. The account information may be comprised of: 1) name of restaurant; 2) name of contact; 3) address of restaurant; 4) phone number; 5) E-mail; 6) fax number; 7) number of seats; 8) price point (average price for a meal); 9) restaurant legal name; 10) tax ID; 11) credit cards that are accepted; 12) other billing information; 13) neighborhood; 14) cuisine; 15) atmosphere; 16) kid friendly; 17) handicap access; 18) cigar friendly; 19) hours of operation; 20) dress code; 21) entertainment; 22) takeout; 23) delivery; 24) catering; 25) special awards; 26) long description (for home page); 27) user ID; 28) password and 19) password hint/answer.

While restaurants will have access to the system via the Internet, it is preferable that the restaurants not be able to delete their account online. Rather, the deletion of accounts should be performed by a customer service representative. Nevertheless, when an account is deleted, all data will be maintained and the account's status will be changed to inactive.

To provide an added level of security, the system will require the user to change the password at first login. The user id will be permanent, but the password can be changed as often as needed. The Restaurant can change their password by accessing their account/profile information on the personalized page. To change the password, a page will be displayed that will ask for the restaurateur's current password, for the new password, and a confirmation of the new password. The restaurant can also change their email address by accessing their account/profile information on the personalized page.

For providing additional information that may assist a restaurateur to better understand their business, the system may be configured to provide the restaurateur with information, such as system usage/feedback information, based upon a restaurant profile. This profile is generally created by posing the following questions to the restaurateur: 1) do you want to receive reviews/feedback from member customers; 2) do you have a profile preference for these potential reviewers; 3) do you have a computer; where is this computer located; 4) do you have Internet access; 5) do you use a customer data management system; 6) do you take reservations by fax/Internet browser; 7) what are the best times to contact; 8) how the restaurant wishes to be contacted (phone, email, in person); 9) what are gross sales; and 10) do you use a restaurant management system?

For maintaining the restaurant's content page, a module may be provided to allow individual restaurants to view their content information. Content information is most of the data that will be displayed on the restaurant's home page. For example, the restaurant menu will be considered content information. In one embodiment, merchant services will scan the menu(s) for the restaurant for display on the Internet site. If the restaurateur wants to change the menus or the pictures of the restaurant—the process will be to go through merchant services via email or a phone call. When displaying the restaurant's home page, it is preferred that the home page have a predefined format since it is easier for the consumer to view restaurant pages on the Web site if the layout is predictable. In this regard, the restaurant's content page(s) should consist of some or all of these items: 1) the restaurant's contact information (address, phone number, fax number)—from the restaurant's account information; 2) hours of operation—from the restaurant's account information; 3) photographs of the restaurant; 4) scanned in food menu; 5) scanned in wine menu; 6) map to restaurant; 7) registered incentives; 8) base incentives; 9) reviews; 10) if the restaurant takes online reservations; and 11) if the restaurant takes reservations.

For creating a customer account, the system includes a consumer's account module. When the customer either creates a "personalized" page or joins the system as a member a consumer account will be created. The consumer will be allowed to view, but preferably not be allowed to update, the information in their personal account directly via the Internet. It is preferred that updates to the consumer account be handled via an email or phone call to customer service. The consumer account consists of at least: name, email address, zip code, user ID, password, password hint/answer. The member account (level 2) consists of the above personal account information plus: address, phone number, and credit card number(s). Verification will be run on the credit card information. A level 2 consumer who requests removal of his credit card information will temporarily give-up membership status. This action will move the consumer from a Level 2 to a Level 1 consumer and will not allow usage of the incentive program without re-registering a credit card number.

In addition to the consumer account information noted above, profile information about the consumers may be asked for/volunteered during sign-up for a personal page and member registration. In addition, the system, via cookies, may keep track of what geographic areas the consumer searches for restaurants in and will use this to drive personalization in the future. This profile information may be used to enhance the consumer's enjoyment of the system by, for example, sending the consumer promotional materials for which the consumer has indicated an interest. The profile information may consist of some or all of the following: 1) price range; 2) cities that are visited often; 3) neighborhood/location; 4) typical credit card used; 5) cuisine preferences; 6) send me emails alerting me to special deals; 7) frequent flyer program memberships; 8) use of the services such as limousine, valet parking, travel agent, rental cars, hotel frequency programs; 9) household income, profession; 10) frequency of business dining; 11) use of dining membership benefits (business, celebrations, holidays, every time I dine, etc.); 12) send me emails about new restaurants in my area, (and my favorite areas); 13) loyalty program number(s)—Frequent flyer numbers, hotel card numbers, etc; 14) dine out most often alone, with friends or family, with children; 15) send me email to review or give feedback to restaurants where you have recently visited; 16) types of marketing would you like to receive; 17) types of promotions preferred, such as points per dollar spent or a percentage off the meal; and 18) important dates. The important dates and a description of these dates (e.g. birthdays) may allow the system to drive aspects of the personalization. The sending of emails would be managed by the system.

To provide for customization of the system Web pages to the specific user, the consumer profile may be utilized. For example, the system will create a personalized page for its Level 1 and 2 consumer. The customized page may offer marketing that will eventually be targeted to the consumer's account and profile information. Other personalization features may include: consumer's name, localized restaurants and some level of promotion and incentive segregation. When created, the personalized page will be used as the default home page for the user whenever he accesses the system Web site. It will contain functionality options that have been carried over from the home page plus some personalization as described above.

It is contemplated that personal pages could be created without the consumer's direct knowledge. For example, when the consumer requests to get a benefit from a restaurant his name and e-mail address is required. By entering this information the anonymous consumer has just been promoted to a Level 1 consumer and will, by default, have a customized page.

In a preferred embodiment, the personalized page may contain the following:

My Dining Plans—This section will give the consumer an overview of his pending reservations and registered incentives. It will show a maximum of five reservations with the option that the consumer can one-click in to a more expanded list. For each reservation the consumer will be shown the restaurant's name, the time and the date of the reservation. The consumer will be able to select the individual reservations and be given even more details of the reservation and the ability to cancel or edit it.

New in Area—This area of the site will give a listing of the restaurants that are new to the consumer's area. The area will be defined by the zip code on the consumer's account and the definition of "new" will be defined by customer service.

My Account—This area of the site will show the consumer a summarization of the total amount of incentive points, etc. he has collected by participating in the system.

The view may include a view of the consumer's historical transactions or allow the consumer to view his registered cards. Basic account information should be available for viewing only (level 1 required info as described above).

Redeem Points—In this area the consumer will be able to redeem his incentive points for dining vouchers, frequent flyer miles, or other rewards. This may be handled via an email form to customer service release.

Turning now to the restaurant personal page, the purpose of the restaurant personal page is different from the consumer's personal page in that it is intended to be purely functional. The restaurant will be accessing this page for the purpose of managing their reservations, incentives or seating allocation. With this in mind, the restaurant's personal page may be presented in a tabular format. Each tab on the page will represent different functionality that is available to the restaurant, such as:

My Reservations—In this area the restaurant will be able to manage the reservation book and table allocation. The restaurant will be allowed to view the different reservations that have been made at the restaurant and get more detailed information about the reservation including comments made by the person who made the reservation. This is also where the restaurant can add comments to the consumer who made the reservation for future use.

My Benefits—This section will detail the benefits that the restaurant receives by using the incentive or the online reservation program and details the current benefits that the restaurant is entitled to.

My Promotions/Incentives—In this section the restaurant can view and edit their incentive program. This includes both the base and the registered incentives.

My Account/Profile—From this section the restaurant can view their account information and change their password or email account. There will be an area for the restaurant to contact a sales representative or merchant services to update other entries. The restaurant can also view their content page, which will consist of both menus and pictures of the restaurant.

Contact a Sales Representative.

My Customers—This is where the restaurant can see any reviews that pass the webmaster's edits.

As a user aide, there may be a help menu on the left side of the web page that will summarize the functionality of each tabbed section. This will give the restaurants an overview of what can be done on the site and help them by providing links to key areas.

To handle any actions that can be performed by both consumers and restaurants, an all account relations management module is provided. One such action is the providing of user feedback about the system to the system administration. Both restaurants and consumers may have the ability to provide feedback from the Help menu on any of the site pages. This feedback may be received by the system administration and confirmed by email.

Another function available to consumers and restaurants is contacting customer service. Both the consumer and the restaurant will have the ability to contact the systems' customer service with either a comment or a question. This can be done via the Help menu that will be located on all site pages.

For use in creating and storing consumer reviews, a create review module is provided. This module will allow consumers to create and store the consumer reviews for the restaurant and other relationship management actions. A review is consumer generated information about a restaurant that may be made available to all visitors of the system site. To create a review, a consumer will perform a search and then click through to a restaurant's home page. There will no limit on the number of reviews that a consumer can create on one restaurant. The review will be a very simple template that will consist of ratings (i.e. likeability scale, food quality, etc . . . ) and a comment section. The ratings information and the comment information will be viewed as two separate things by the system. The consumer's rating information may be simply stored without review. However, if the consumer enters text in the comment section, it is preferred that the consumer's comments be read by the system's webmaster and edited if necessary before being posted into the restaurant's account. In this regard, there will be informational messages to tell the user that if comments are entered the text must go through a review process prior to being posted to the site.

After performing a restaurant search of any type, be it for making a reservation or performing a general search, the consumer will be able to read the reviews that have been given for a selected restaurant by other consumers. These reviews will initially consist of an overall rating, indicating an average rating and the number of people that were averaged in, and textual comments. The comment reviews may be ranked by the amount of information available about the person giving the review. For example, if the person giving the review has an associated dining experience at the restaurant they will be listed first. If there is no information on the person giving the review, except the name and email address, it will be listed last. While restaurants may use this method to also view reviews which are written about their restaurant, the system will make such reviews available on the restaurant's personal page.

To enhance the desire to use the system, the system will provide an incentive management module. This module will manage the types and amounts of incentive given to the consumer for dining at particular restaurants. On a dynamic basis, restaurateurs can create/update/delete incentives. Incentives include points given to the consumer per dollar spent, a percent off the bill total, etc. These incentives can be managed either online by the restaurateur or they can call a system sales representative. It is also contemplated that a voice response system may be used for restaurateurs to update incentives.

In a preferred embodiment, there will be two types of incentives that can be offered to the consumer. The first is a base incentive, which will be offered on a daily basis and does not require the consumer to register acceptance of the offer with the system or make an online reservation. The second type of incentive is a registered incentive that requires the consumer to register an intent to dine or to make an online reservation. Restaurants can choose to offer any combination of these incentives, to be offered at anytime of the week, or no incentives at all. Once a consumer has made a reservation or has registered for the incentive the incentive is locked in, and the conditions of the registered incentive can not be changed. Restaurateurs will be able to modify registered incentives as needed, however, base incentives should only be updated seven days prior to the set incentive date. For example, if a restaurateur wants to update the next week's base incentives he should do it before the Monday of the current week.

To provide a convenient means for allowing restaurateurs to sign up for the incentive plan, a description and the benefits of the restaurant incentives program can be viewed online or be explained by a sales representative. If the restaurant requests, a sales representative can come out to the restaurant to describe how the program works and the benefits to joining the program. Once the restaurant has decided to join the systems' incentives program a sales representative will meet with the restaurateur to discuss and decide on the terms of the agreement which will be agreed upon and signed. The sales representative will ensure the restaurant is added to the system database and is properly designated as a restaurant being signed up with incentives. Base incentives may be initialized to a predetermined amount. Thereafter, the default effective date on the base incentive may be 10 days after the date the restaurant receives incentives to provide the restaurant a window to change their default base incentives before they go into effect.

Base incentives will be stored at the day level along with an effective date. When updating a restaurant's base incentives, a business rule (which the web administrator can change) will resolve any conflicts. As an example of a rule, given that there may be updates to the base incentives over time, the active base incentive may be designated to be the one with the highest effective date that is less than or equal to the current date.

TABLE 1

BASE INCENTIVE EXAMPLE

| Mon. | Tue. | Wed. | Thu. | Fri. | Sat. | Sun. | Effective Date |
|---|---|---|---|---|---|---|---|
| 10% | 20% | 20% | 10% | | | | Jan. 1, 2000 |
| 15% | 20% | 20% | | | | | Mar. 1, 2000 |
| 20% | 20% | 20% | 20% | 10% | 10% | 10% | Jun. 1, 2000 |

In the example illustrated in TABLE 1, the active base incentive would be the record with the effective date of 'Mar. 1, 2000' on the date May 25, 2000.

To ensure that consumers have ample time in viewing and understanding restaurants' base discounts, restaurants should give consumers seven days prior notice to changes of their base incentives. The restaurants can enter as many base incentive records as they would like as long as the effective date is greater than seven days from the current date. Furthermore, pre-defined black-out days may be offered by the system in a drop-down menu format. Black-out days-if selected-will over-ride the base incentive for the day. They will be listed in the "base incentive" explanation for each restaurant that chooses black-out days. The consumer will be able to tell in advance if a black-out day has been chosen by a restaurant.

After a restaurateur has signed up for incentives they have the ability to make changes to their registered incentives any time they want via the internet or over the phone with a customer service or sales representative. Registered incentives will be stored at the day level along with an effective date and expiration date. Restaurants are not required to have registered incentives. Registered incentives may be given in addition to any base incentives that a consumer might receive.

At any single point in time a restaurant can only have one active registered incentive record. This is enforced by ensuring that an incentive record can not have an effective date that is less than another incentive record's expiration date and also greater than that same record's effective date. The restaurant will also specify the maximum number of times they are willing to extend the registered promotional incentive per any given day.

TABLE 2

EXAMPLE OF INCENTIVE RECORDS

| Mon. | Tue. | Wed. | Thu. | Fri. | Sat. | Sun. | Effective Date | Expire Date | Max. Offers |
|---|---|---|---|---|---|---|---|---|---|
| | | | 10% | | | | Jan. 1, 2000 | Mar. 1, 2000 | 5 |
| | | | 15% | | | | Mar. 1, 2000 | Jun. 1, 2000 | 5 |
| | | | 20% | | | | Jun. 1, 2000 | | 5 |

In the scenario presented in Table 2, the active registered incentive would be 15% off on all Thursdays until Jun. 1, 2000 when it goes up to 20% off. The restaurateur can change their registered incentives at any time, but once a customer has made a reservation or has registered for the incentive (made an "intent to dine") the incentive is locked in, and the amount can not be changed for that particular consumer. Once the maximum number of consumers have registered their intent to take advantage of the incentive on any given day, the incentive will no longer be offered on that day.

As a further incentive, points may be accumulated through dining experiences which can be redeemed for electronic dining vouchers, frequent flyer miles, etc. With respect to dining vouchers, the amounts may be in increments, for example, of $25.00 with the smallest amount being $25.00. The assumption will be that any amount of the voucher that the consumer does not use on his meal is lost. The number of points required to purchase a voucher may be dynamic and may be determined by a business rule which takes into account the type of restaurant and the day-of-the-week. By way of example, the cost of a voucher will depend on whether the diner wishes to dine during off-peak hours (5,000 points=$100 voucher) or peak hours (6,500 points=$100 voucher). Each restaurant will indicate peak and off peak times. The consumer must specify the name of the restaurant where the voucher will be used and the date that the voucher will be used. There will be a link to the online reservation page of the site from this part of the application. A confirmation of the redemption will be sent to the consumer after the redemption transaction is completed, and the consumer's customized page will indicate existing and unused redemption points.

To redeem incentive points, consumers will be able to view their total points from the consumer's personal page and select the option to redeem their points for dining vouchers. Once the user has selected the option to redeem their points, they will be taken to a new page where they can select from a drop down list of predefined dining vouchers, such as "Dinner for 2, up to $100." Next the consumer will select the day of the week and the restaurant where the diner will occur. Depending on whether the restaurant has defined the preferred day of the week as off-peak or peak will effect the number of points needed to earn the dining voucher. The restaurant selected must be a Level 3, Level 4, or Level 5 restaurant. A search will be offered to help the user in selecting a participating restaurant. If the restaurant allows reservations one can be made at this time, or a later date.

Upon submitting their dining voucher request, the system performs a validation to ensure the user has enough points to honor the request. If the user does not have enough points the system them will help make a dining voucher match by offering the user an alternative restaurant or day to dine. Upon the successful redemption of points, a confirmation will be sent to the user confirming the amount of the virtual voucher, the restaurant and day of the week it is good for, and a voucher unique tracking number. If the voucher is redeemed for less than the voucher's dollar amount, then the operators of the system will be credited with the dollar balance. If the consumer does not use the dining voucher by dining on the chosen date and at the chosen restaurant, then their voucher will expire and their points will revert back to their point bank.

To view the incentives that restaurants are offering, the user can access the information by looking at the restaurant's personal page. There will be a link from the page to this information. Alternatively, when making a reservation (selecting the time, number in party, etc . . . ) the consumer can choose to view the incentives offered by the restaurant. Still further, the user can click through one of the rotating "restaurant incentives" ads and be taken to the restaurant's personal page to view the incentives. Thereafter, the consumer can register for a promotional incentive in several different ways: 1) by clicking through an ad in the rotating "restaurant incentive" banner and then accepting the offer with a click on "yes"; 2) by performing a biased search for the registered incentives on restaurants, viewing the registered incentive and then clicking "accept" on a particular incentive to select it; and 3) by performing a regular search on a restaurant, viewing the registered incentive and then clicking on "accept."

If the consumer has not given the system their credit card information they will be required to do so before they can register for the promotional incentive. Also, in order to take advantage of a registered incentive a date the user intends to dine must be provided by the user. If the promotion is still available on that day the user will be registered for the incentive, otherwise they will be notified that the promotion is full on their intended dining date and will be offered the next available registered incentive. The consumer will be able to view their registered incentives on their personal page. All future dining experiences, both registered incentives and reservations will be listed together and can be easily viewed on the user's personal page.

To assist in taking online reservations, the system includes a reservation book that is created and updated with those reservations that are made through the system. The reservation book will keep track of the number of open seats available in a restaurant and will re-open tables after a reservation has been made if the restaurant wants to keep a fixed number of tables open online. The restaurant may specify the total number of tables in the restaurant that are to be included in the system database and then choose a number of these tables as eligible for online reservations. The tables will by allocated by percentages or raw numbers and may also be allocated by day of the week. For example, Monday may have 5% of the tables allocated for online reservation but Tuesday has 10%. The minimum number of tables that can be allocated for online reservation is one. Table allocation can be changed using a browser and interacting with a system account or by calling or faxing a system administrator and asking for help with setting up or updating the online reservation service. In this manner, the restaurateur may manage the number of seats that are available to the consumer online at any time thereby providing for real time adjustment.

When an online reservation is made, the restaurants will be notified when a table in their restaurant has been reserved. This may be done via the Restaurant's system account, online, phone, or by fax. The information that the restaurant will receive should be the customer's name, the number in the party, the time, their smoking preference, any comments that have been made by the consumer regarding his reservation and a tracking number. The restaurant will also have the ability to add comments to the consumer's reservation. These comments will be displayed for the restaurant along with the consumer's current reservation information at his next reservation at this restaurant.

To obtain an online reservation, a consumer need only click on an online reservations icon that is displayed next to a desired restaurant. The consumer will be required to enter the date and time of the reservation, the number in the dining party and the smoking preference. If the consumer selects the "Make a Reservation" heading, a search page will be presented with the above information requested, as well as an option for the consumer to search for all available reservations, for the chosen date/time, for all restaurants defined by the search area. For example, the consumer selects "Make a Reservation," enters March 26 at 7:00 p.m. as the date and time of the dine and chooses to see all available reservations.

The consumer will be required to define an area (city/state, zip proximity, or state/neighborhood) to perform the search. Once the consumer chooses an area, the consumer can further limit the search by choosing the cuisine of the restaurant. The search will return all available reservations for March 26 at 7:00 p.m., for all restaurants within the chosen area and with the chosen cuisine. The consumer then chooses one of these restaurants from the list to complete the reservation. The consumer does not have to be a member of the system to make a reservation but incentives will be contingent on membership.

If there is a reservation available at the restaurant, a message will be displayed offering the consumer the time desired plus two alternate times (one at least 15 minutes before the desired time and one at least 15 minutes after the desired time). The consumer can then confirm to reserve the table. However, if no reservation at the desired time is available, alternate times that night will be shown and the consumer will also be given the opportunity to perform a search for restaurants with open reservations at the desired time. Once the reservation is made the consumer will have the option to send the restaurant and reservation information to a friend via email.

One preferred constraint to the online reservation is that a consumer is not allowed to make more than three reservations on a given night or with in a 4 hour time period. There will also be a warning message shown to the user if he makes a reservation that either conflicts or is within the four-hour window. The user can override this message. The consumer will be reminded the day of the reservation of the existence of reservations at conflicting times.

If the consumer chooses not to show up for a reservation made at a restaurant online then a record is kept of the number of no-shows for this consumer and he runs the risk of losing online reservation privilege. The restaurant can also require that the consumer enter a credit card number and expiration date explaining that a no-show will result in a monetary penalty. In this instance the credit card information will be kept in the database and the restaurant will be given access to this information if needed. The charge penalty for a no-show will be the responsibility of the restaurant.

To avoid no-shows, the consumer will be sent an e-mail reminder of the reservation on the day of the reservation. On the consumer's personal page there will also be an area for the consumer to view his pending reservations, a link to more detail about the reservation and the ability to update or delete the reservation. The reservation can be edited up to one hour before the reservation time.

To search for restaurants at which to dine, a search may be performed that will return to the consumer a list of the restaurants that match the criteria. A short description of the restaurants may also be provided. If the restaurant participates as a system member that takes online reservations, then the consumer can make an online reservation or link to the restaurant's personal page.

More specifically, the consumer can search based upon the following criteria:
  Search on the area where the restaurant is located. This requires that the consumer enter the state and location information to use in the search. The location information will be the city and neighborhood to search.
  Search on proximity of the restaurant to a given zip code. The default zip code will be the consumer's account zip code. The consumer will be able to select the number of miles from a list of 5 miles, 10 miles or 15 miles.
  Search on detailed information about the restaurant. The consumer will be required to enter the city and state to search in. Optional information will be the name of the restaurant.
  Search on the restaurant's area code (use area code/location bar translation)
  Enter the restaurant name directly to search on a pattern match
  Cuisine
  Promotions/incentives
  Credit Cards accepted
  Price Range
  Reservation availability (both online and not online)
  Membership in the system Performing the search will give the consumer a list of the restaurants that match the criteria, a short description of the restaurant and an icon for each relevant content item held by the system for the restaurant (accepts online reservations, has a map, offers base/registered incentives, online menu, etc.). In addition, if the consumer is recognized by the Web site as a Level 1 and above consumer, and the restaurant is a member of the system, then a checkbox will appear allowing the restaurant to be added to the consumer's favorite restaurant list. The checkbox will also indicate if the restaurant is already on the list. This checkbox can be toggled to indicate that it is not to be included as a favorite restaurant. The results of the search will be unbiased and in alphabetical order unless the consumer chooses to perform a "biased" search, one that gives preferential treatment to member restaurants, by selecting a checkbox that will appear on the search form. Also, if the Consumer has performed a search by proximity the restaurants will be listed by nearest to farthest.

After the search has completed there may also be provided a link to a more detailed page for the restaurant. Listed on this page are consumer reviews, the ability to send the information on this restaurant to anyone via email, and the ability for the consumer to perform another search that returns the consumer to the detailed search page. The detailed page may also include pictures of the restaurant and links to the restaurant's menus. If the restaurant belongs to the system and has elected to have online reservations, then the consumer will be able to access that restaurant's online reservation book to make an online reservation or link to the restaurant's content page. The consumer will also be able to send the results of the restaurant search to a friend simply by providing the email address that he would like to send it to.

Figure 4A:
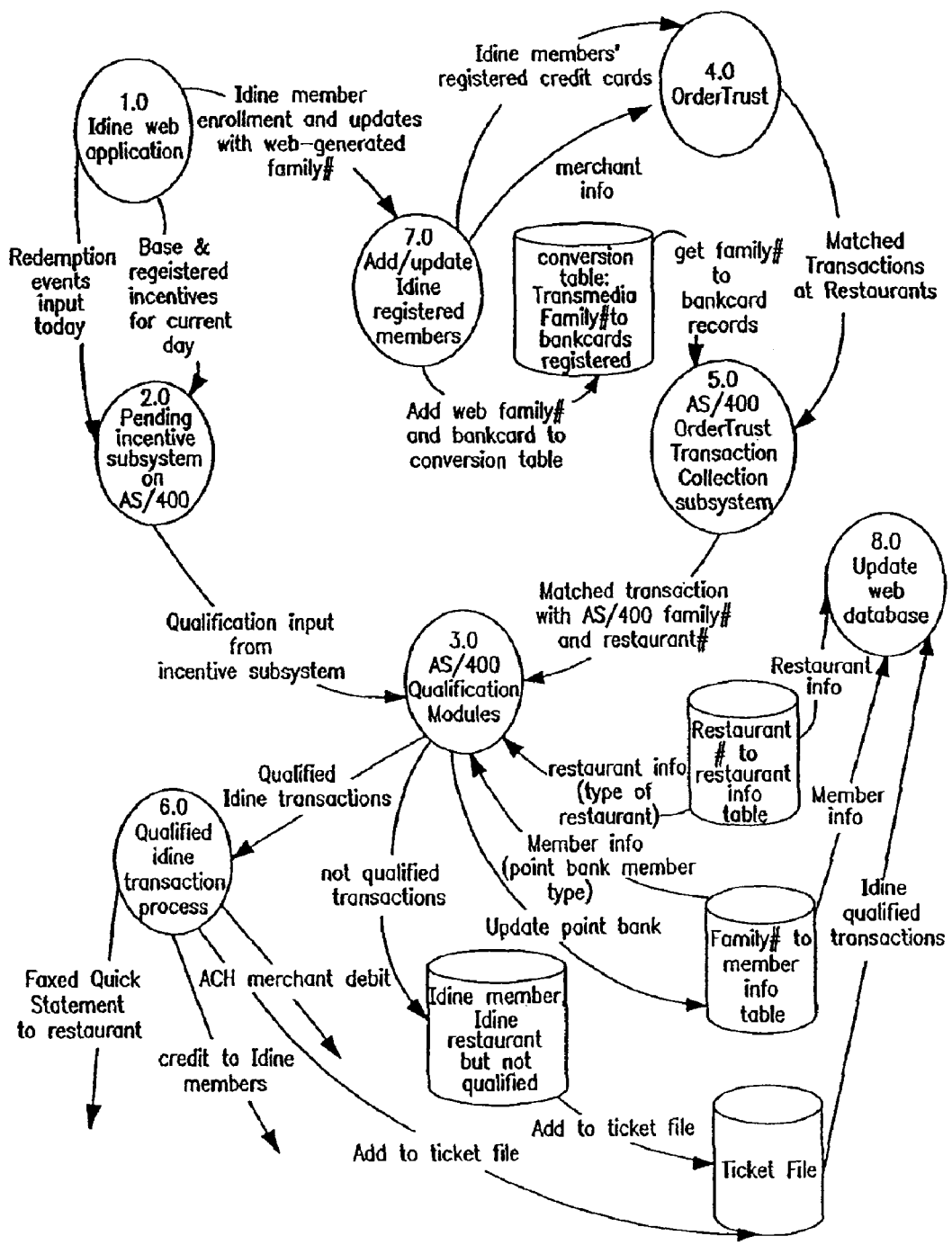
FIGS. 4a-4b illustrate data flow in the exemplary network illustrated in FIG. 2.
Figure 4B:
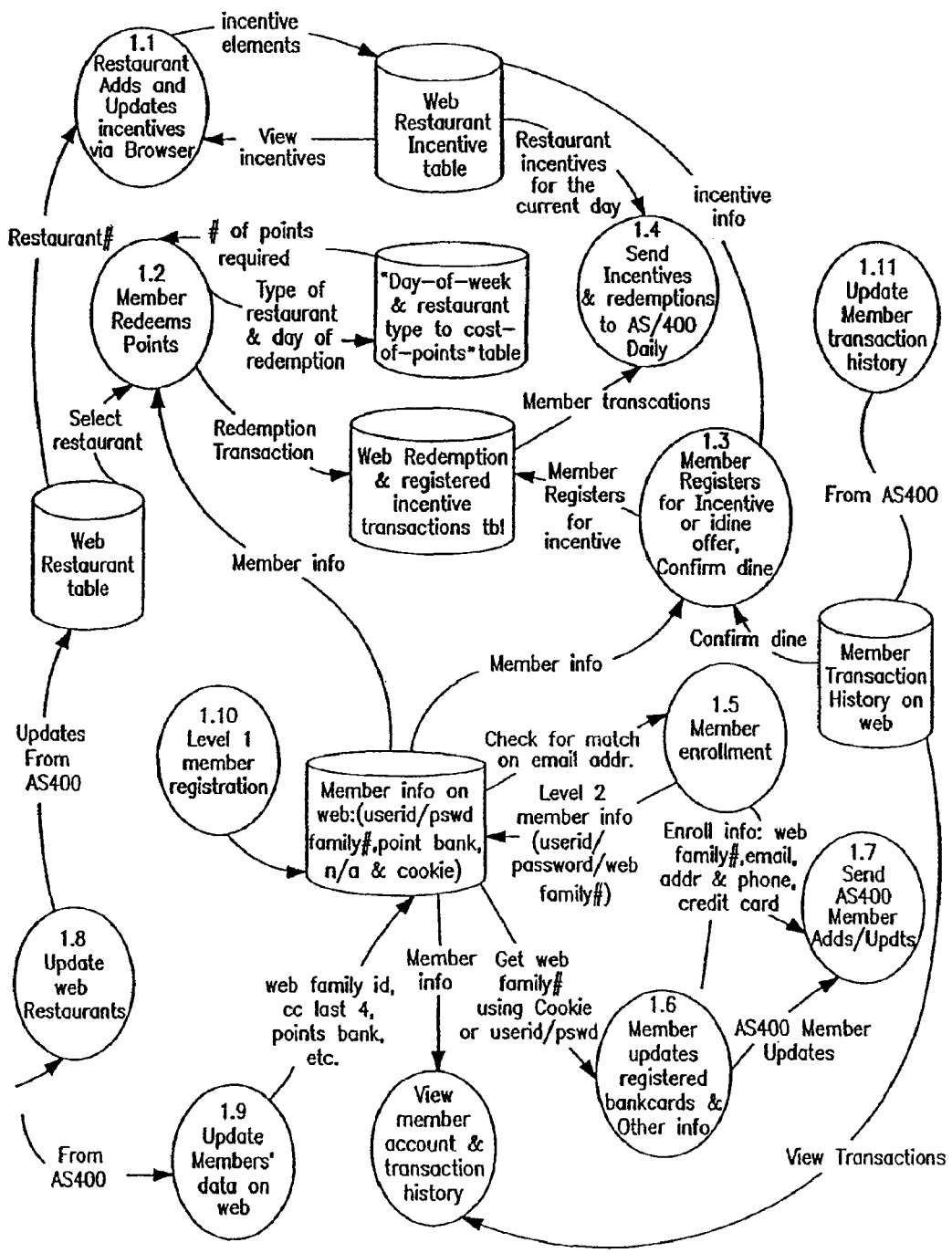
Figure 5:
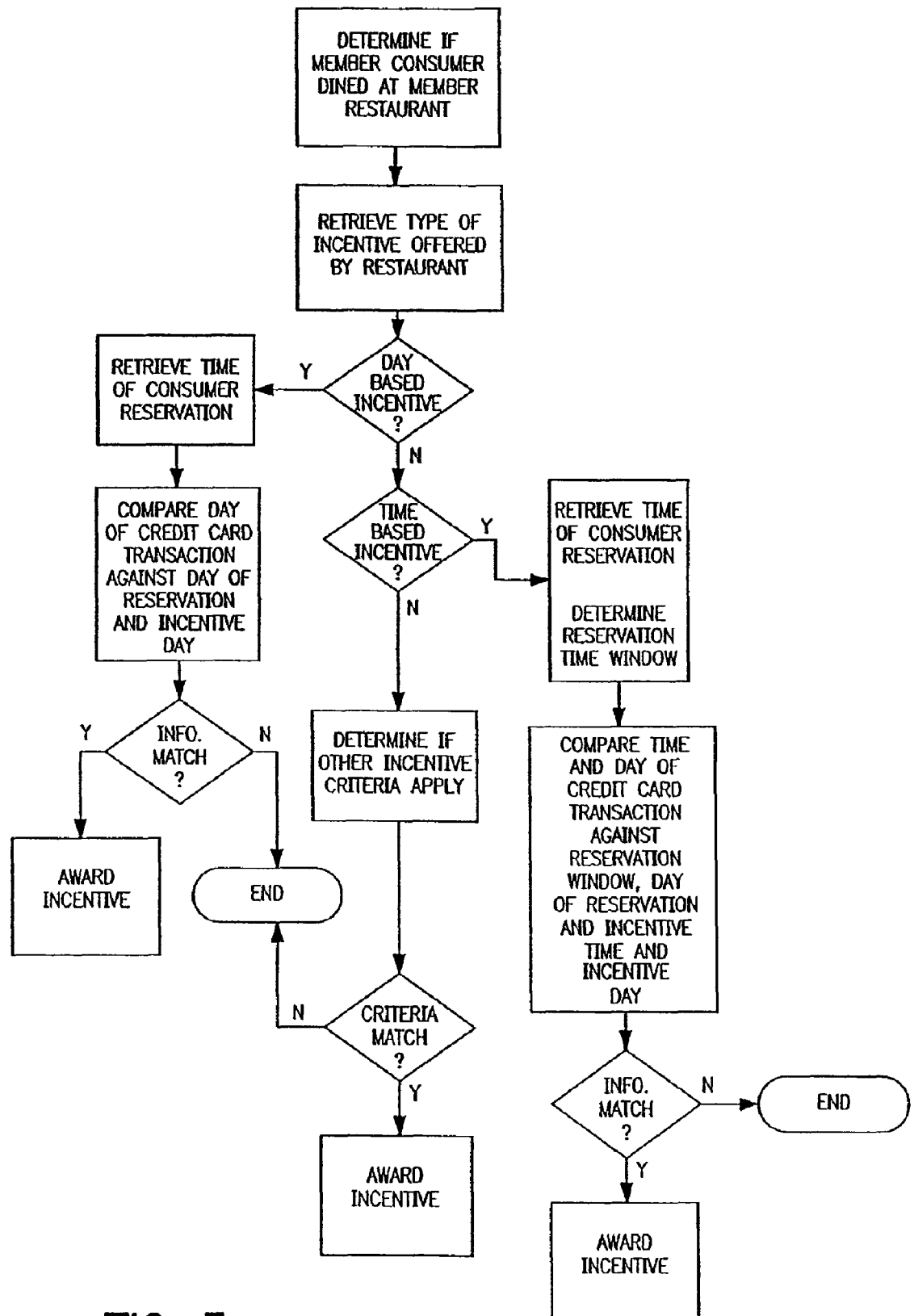

To validate when rewards are earned, a credit card aggregator 16 is utilized that matches credit card charges at member restaurants with credit card account numbers of enrolled members. The information returned from the credit card aggregator is compared with enrollment and update information stored in the database associated with server 18. With reference to the data flow diagrams of FIGS. 4*a* and 4*b*, the process proceeds with the system sending enrollments and redemption/incentive transactions to the database 18. The system also sends a daily file of registered credit cards and participating merchant numbers to the credit card aggregator. The credit card aggregator compares information received from restaurants with the received file and matched transactions are forwarded to the server 18. A further verification can take place at the server 18 to ensure that the merchant number and/or frequent diner registered card contained in the record returned from the credit card aggregator 16 are participating members.

If a match has occurred, one of the following types of activities has been launched:

frequent diner acceptance of restaurant registered incentives—when a frequent diner signals his intent to accept a restaurant's registered incentive offer by clicking through the acceptance path and completing the required information, a registered incentive transaction is maintained in a daily transaction file. A registered incentive is valid for a particular day at a particular restaurant and may be restricted to a restaurant-determined number of tables. Frequent diners who attempt to register may find they exceeded the number of tables the restaurant is offering. In such a case, a message indicating that there are no more tables available for this offer on the particular day is sent—highlighting the scarcity of the offer and encouraging more timely responsiveness in the future by the frequent diner. The key used to link a matched transaction from the credit card aggregator to a pending, registered incentive is the merchant number and frequent diner credit card. If there is a match on both of these elements and a match between the registered incentive offer date and the transaction date, then the system creates a reward record for the member to be used in the reward delivery/qualification process, i.e., updates the customer's point total or informs the credit card company to reduce the customer's charges.

merchant basic incentive offers—If a merchant chooses to set-up a basic incentive for a particular day, a daily file is maintained. The key used to link a matched transaction from the credit card aggregator is the merchant number and frequent diner registered card which are verified as participating members. If the members are participating and the transaction date matches a basic incentive date, the frequent diner will get the basic incentive reward, i.e., the credit card company will be instructed to reduce the customer's charge.

While the foregoing describes the basic features of the subject invention, additional features may be added that include online access to consumer and/or restaurant transaction history. For example, the Consumer may be able to view his points bank online. There may also be a link to contact customer service (via email or phone) so that the consumer can get historical transaction information, report any missing items or make comments.

Figures 2, 3A:
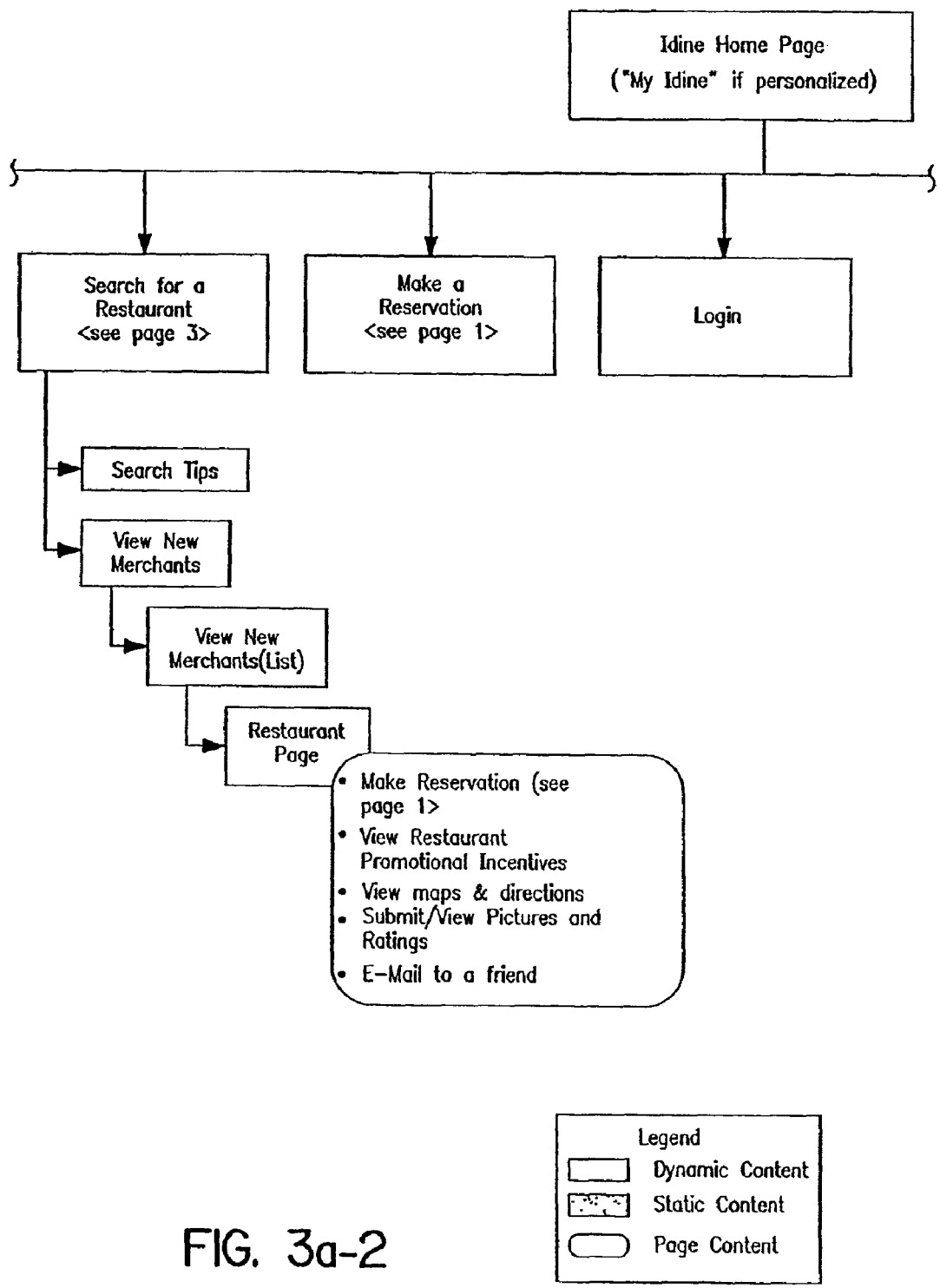
FIGS. 3a-3e illustrate an exemplary Web page map for use in connection with the subject invention.
Figures 3, 3A:
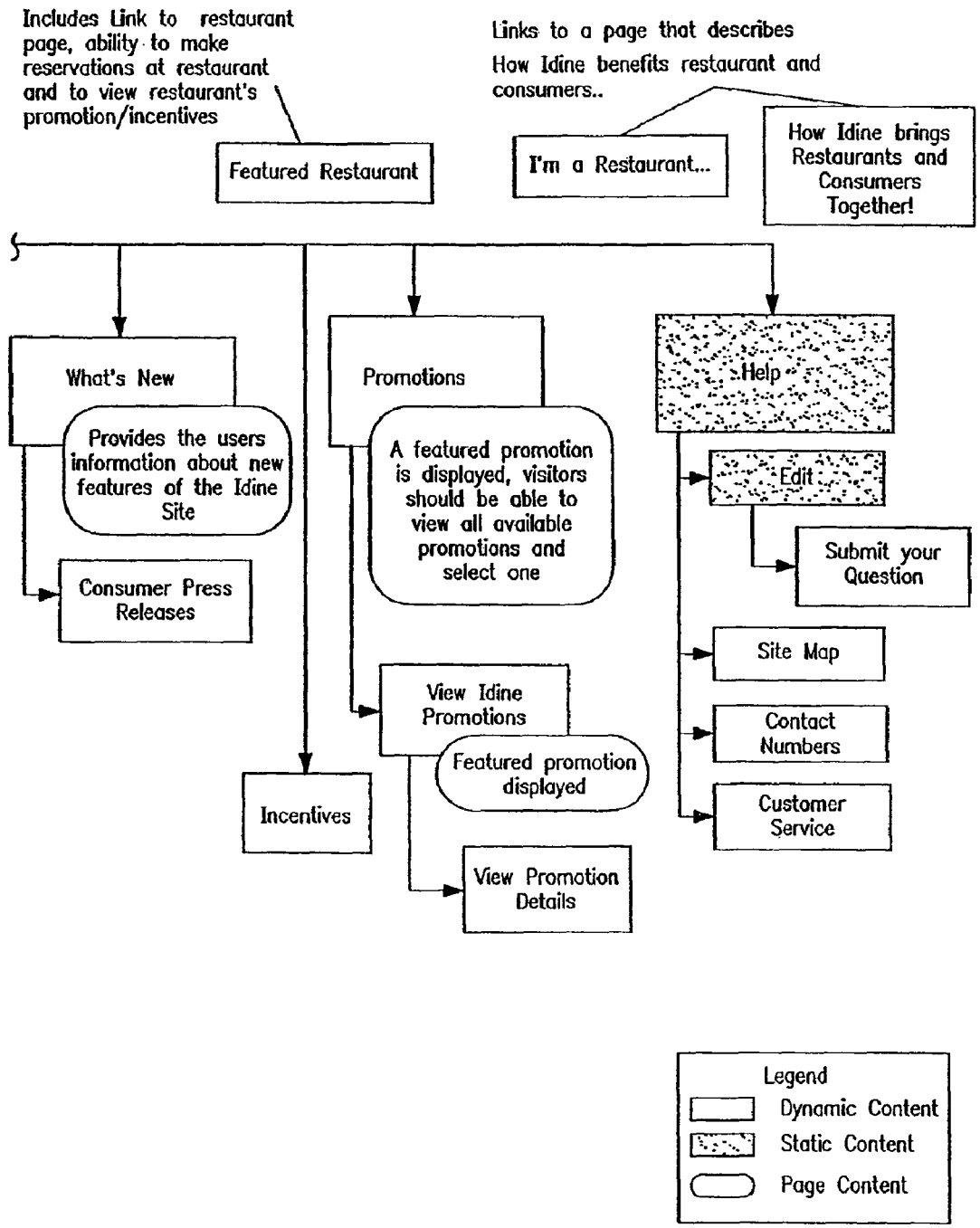
Figure 3B:
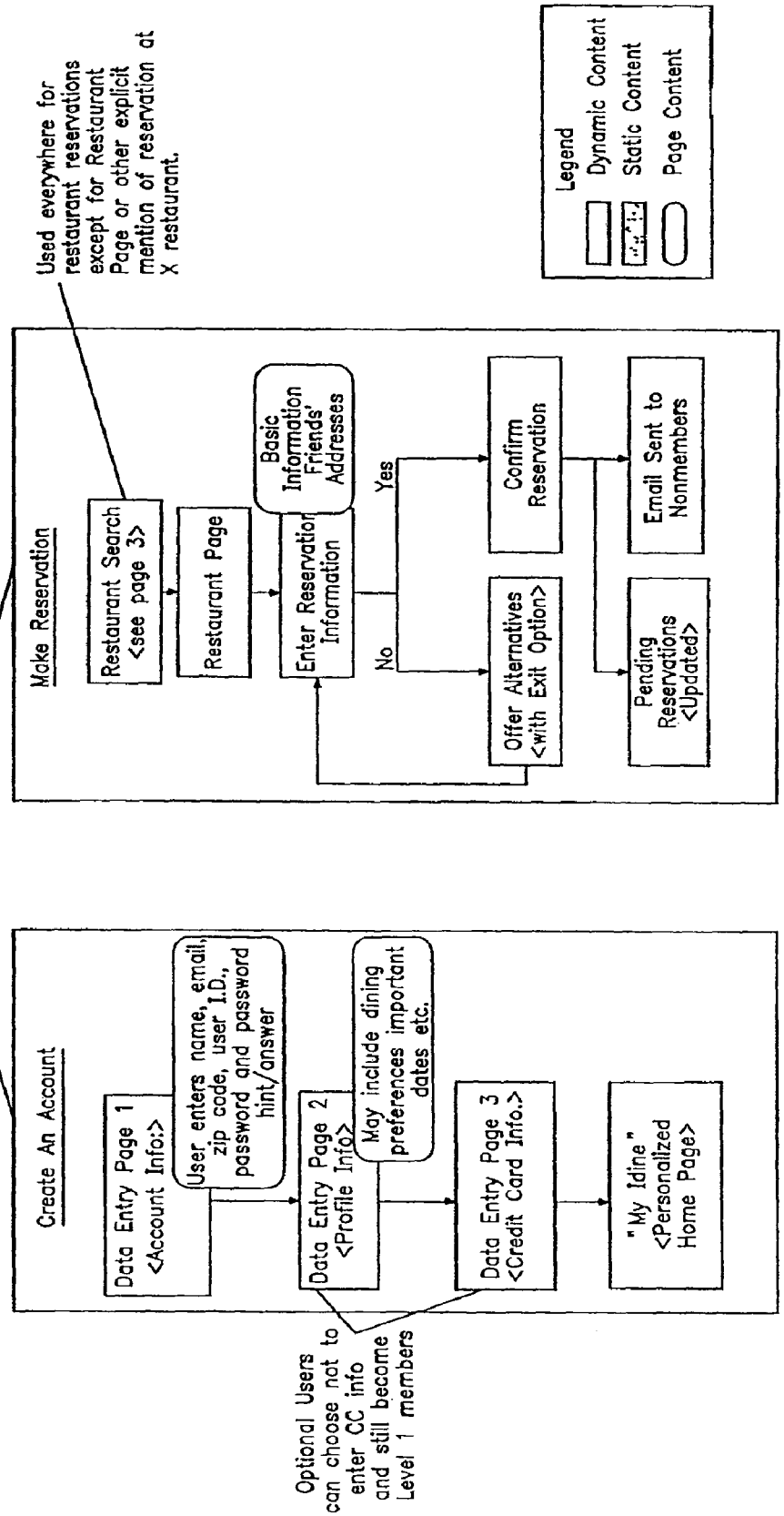
Figures 1, 3C:
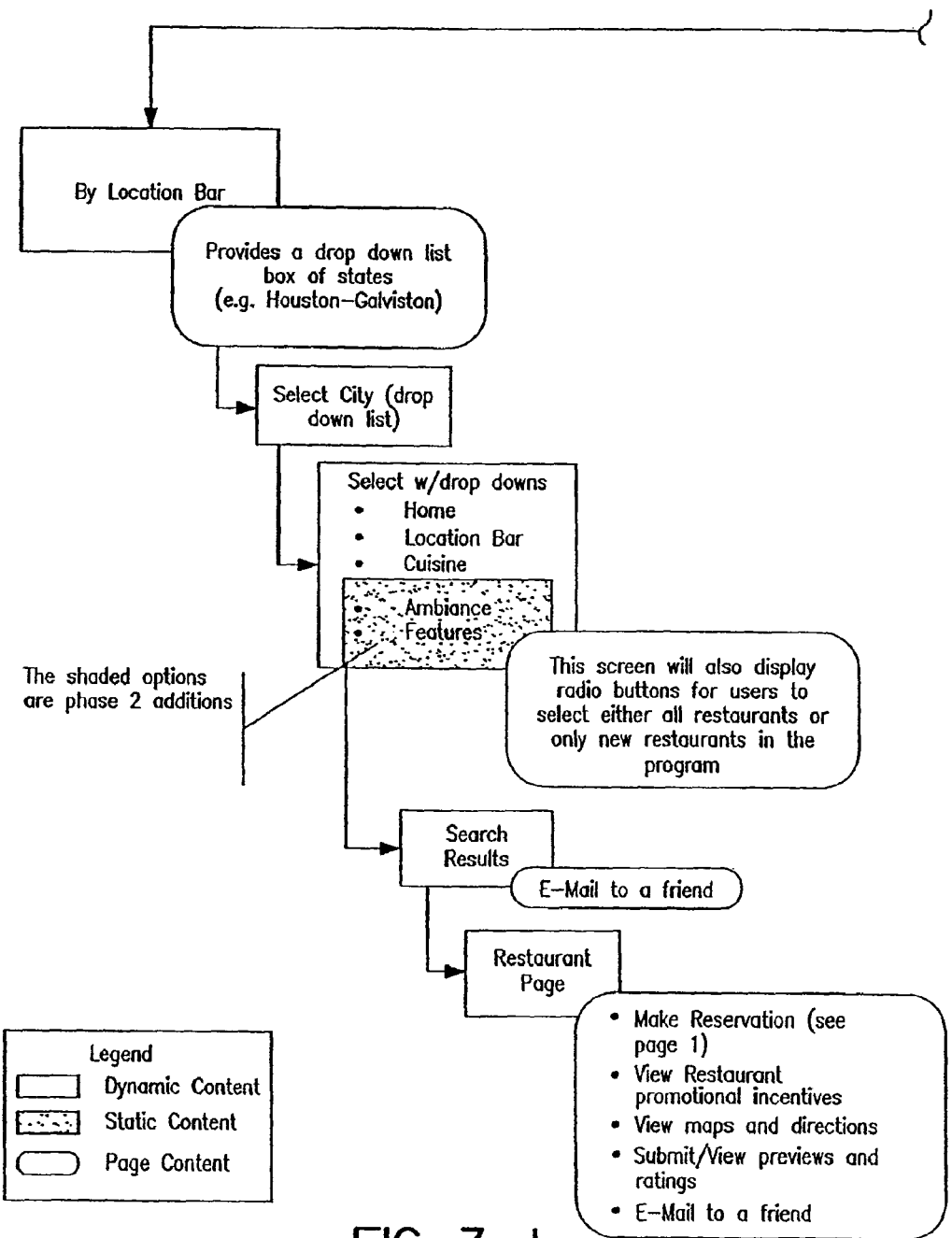
Figures 2, 3C:
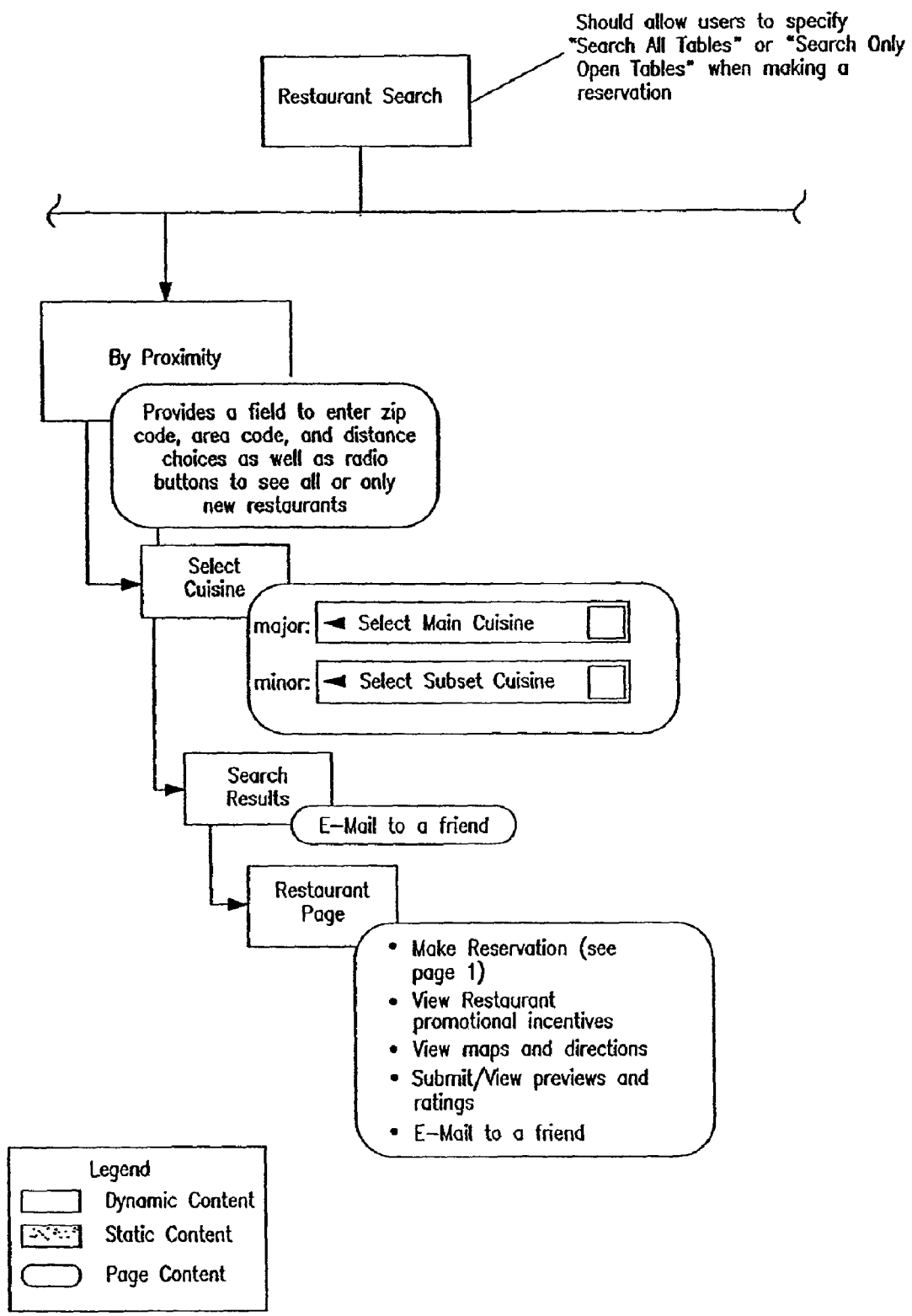
Figures 3, 3C:
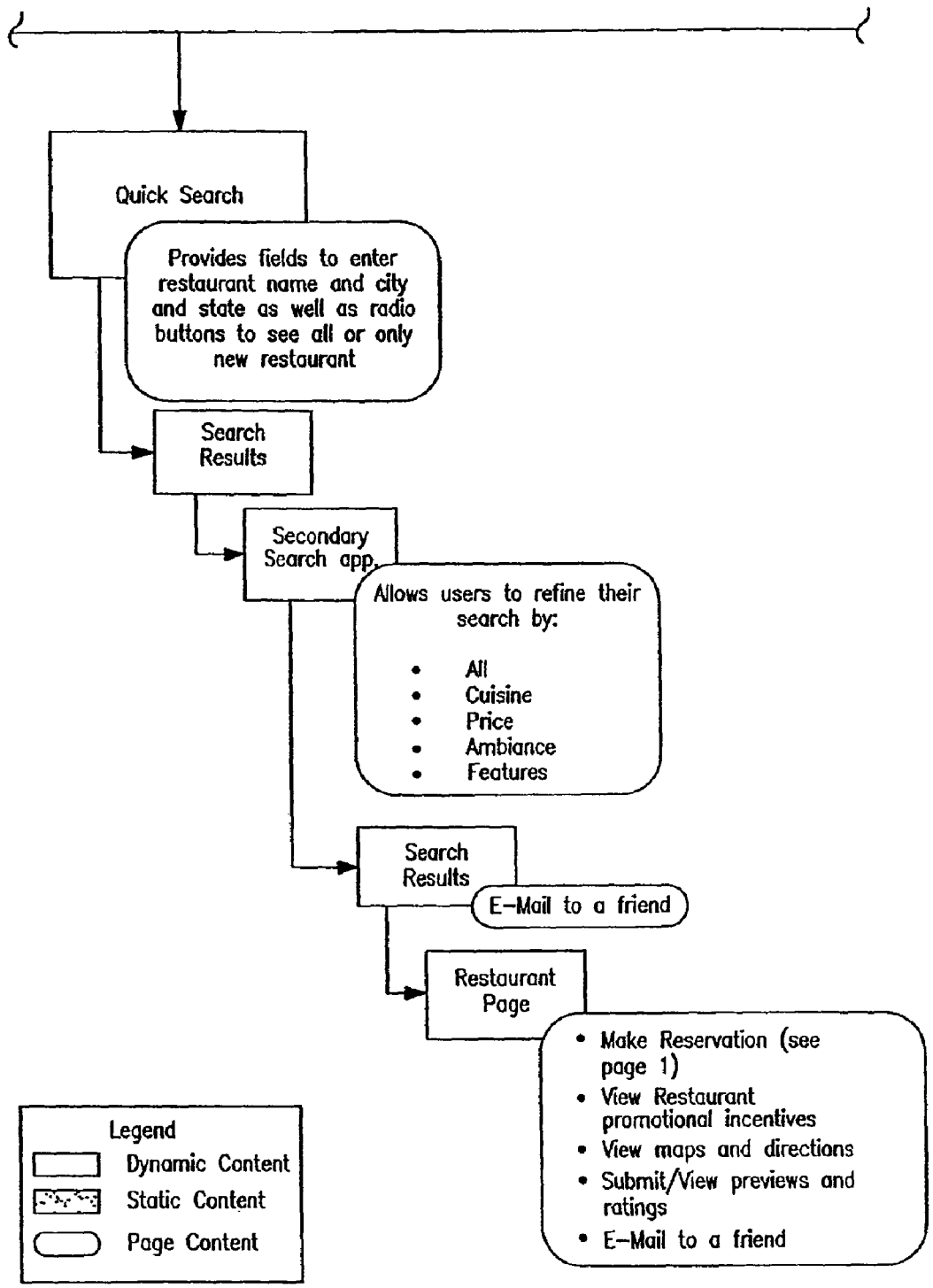
Figures 3, 3C, 4:
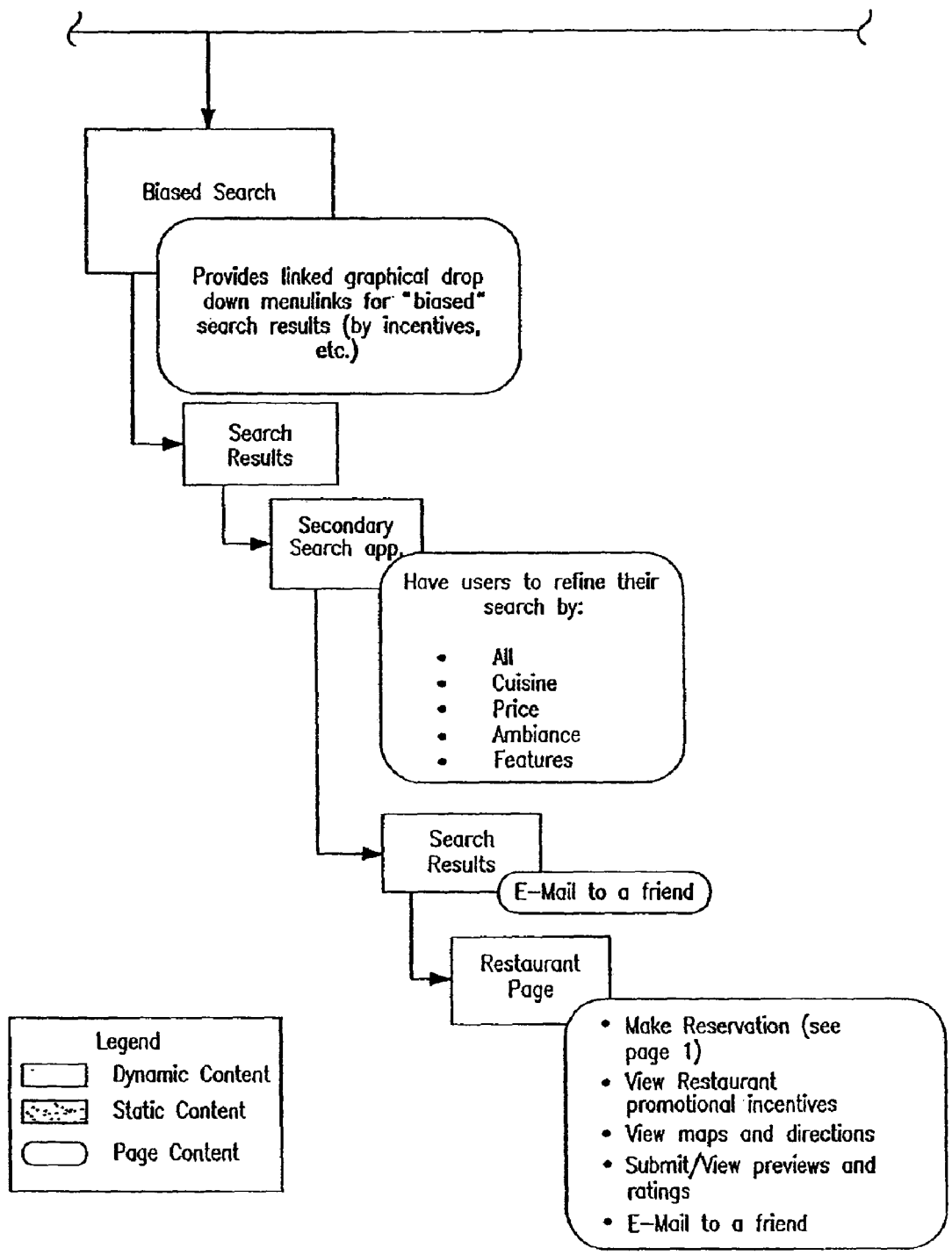
Figures 3, 3C, 4, 5:
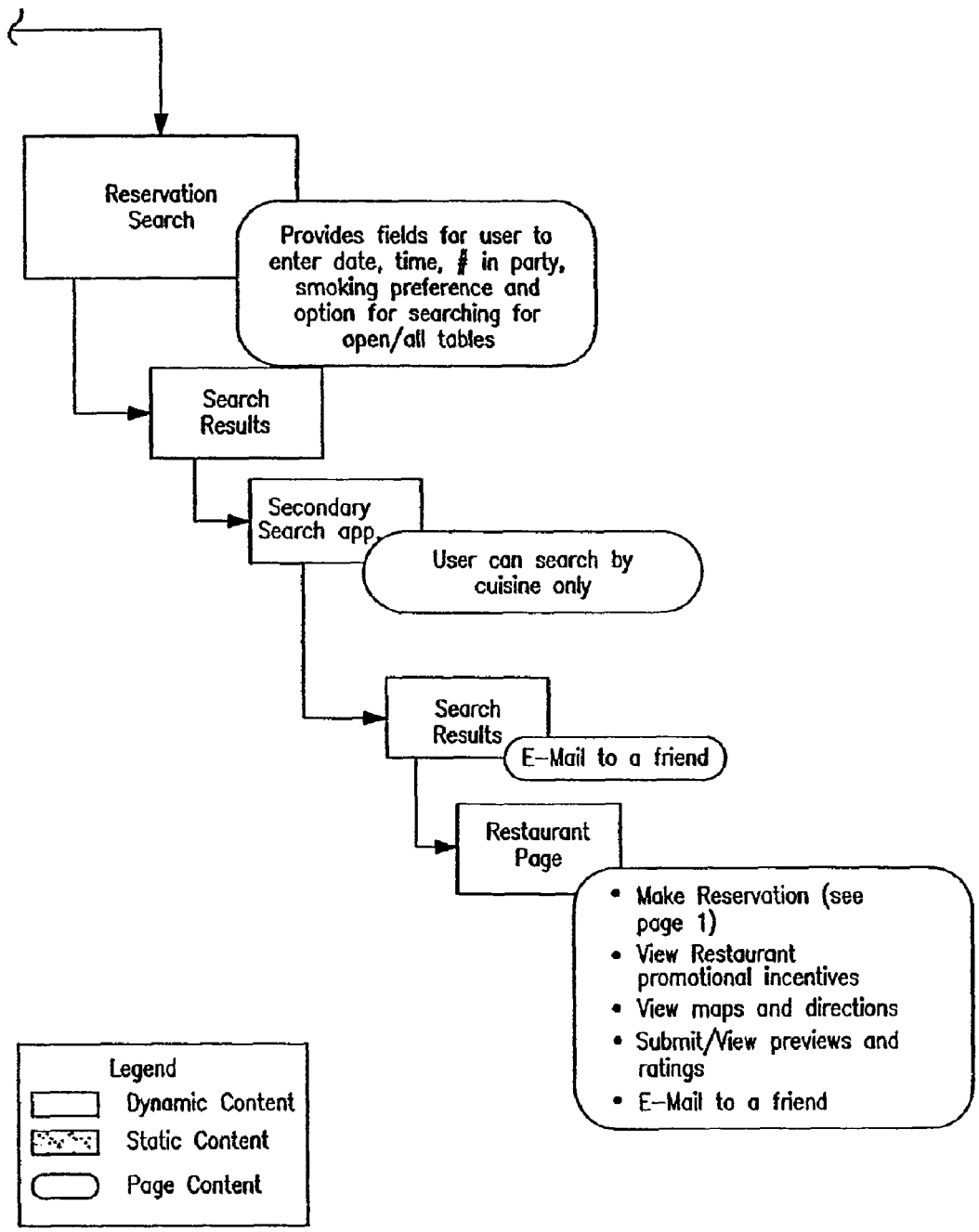
FIG. 5 illustrates a flow chart of an exemplary method for determining if an incentive has been met by a consumer.
Figures 1, 3D:
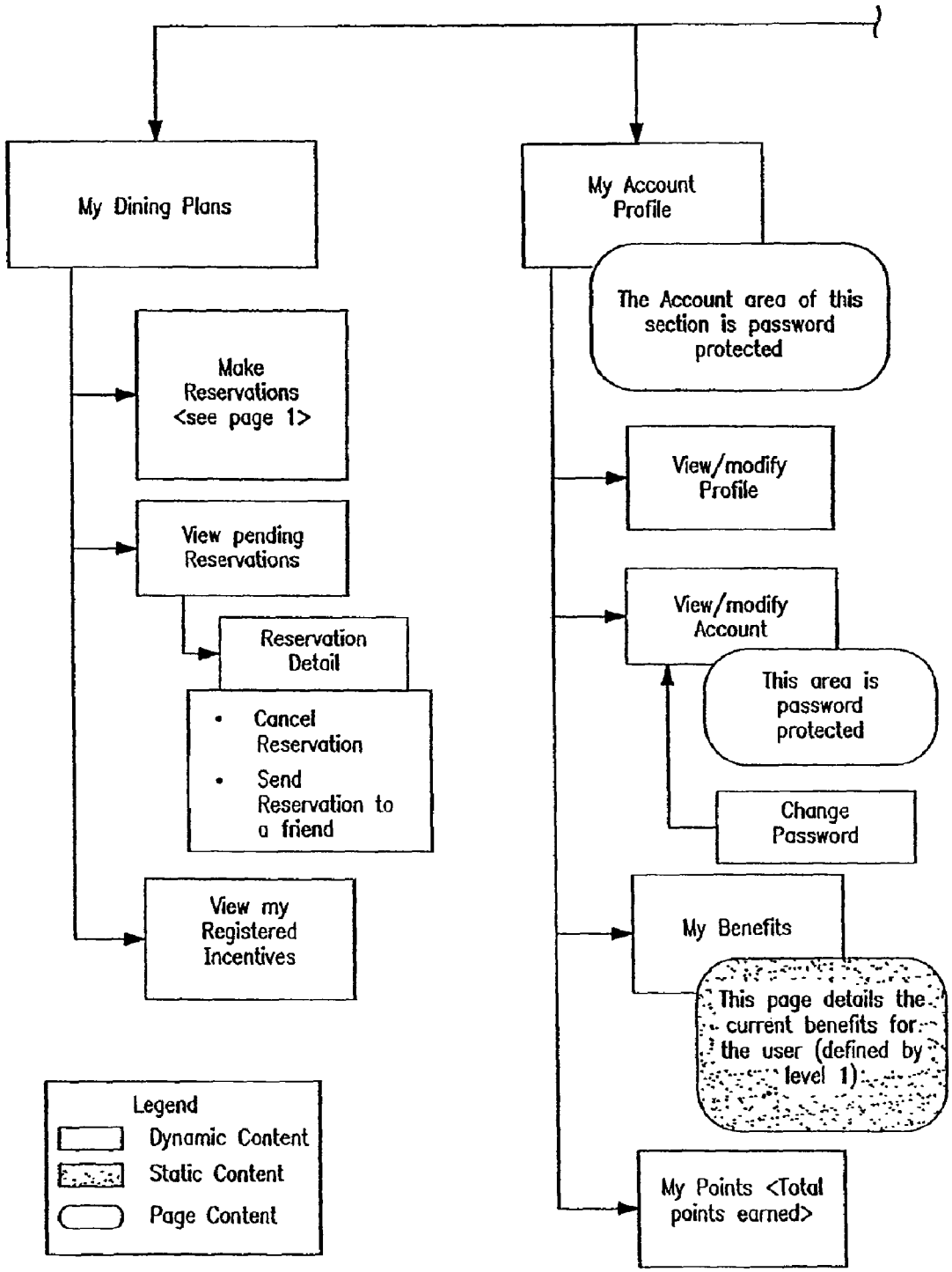
Figures 2, 3D:
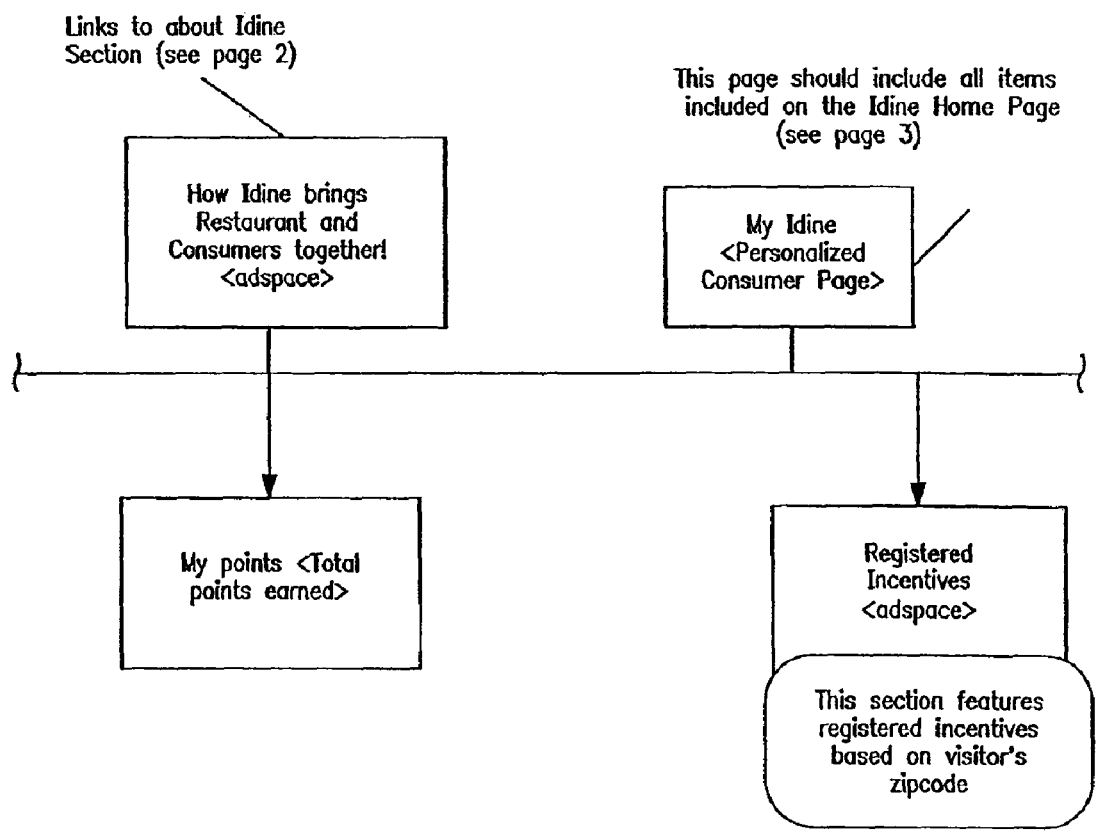
Figures 3, 3D:
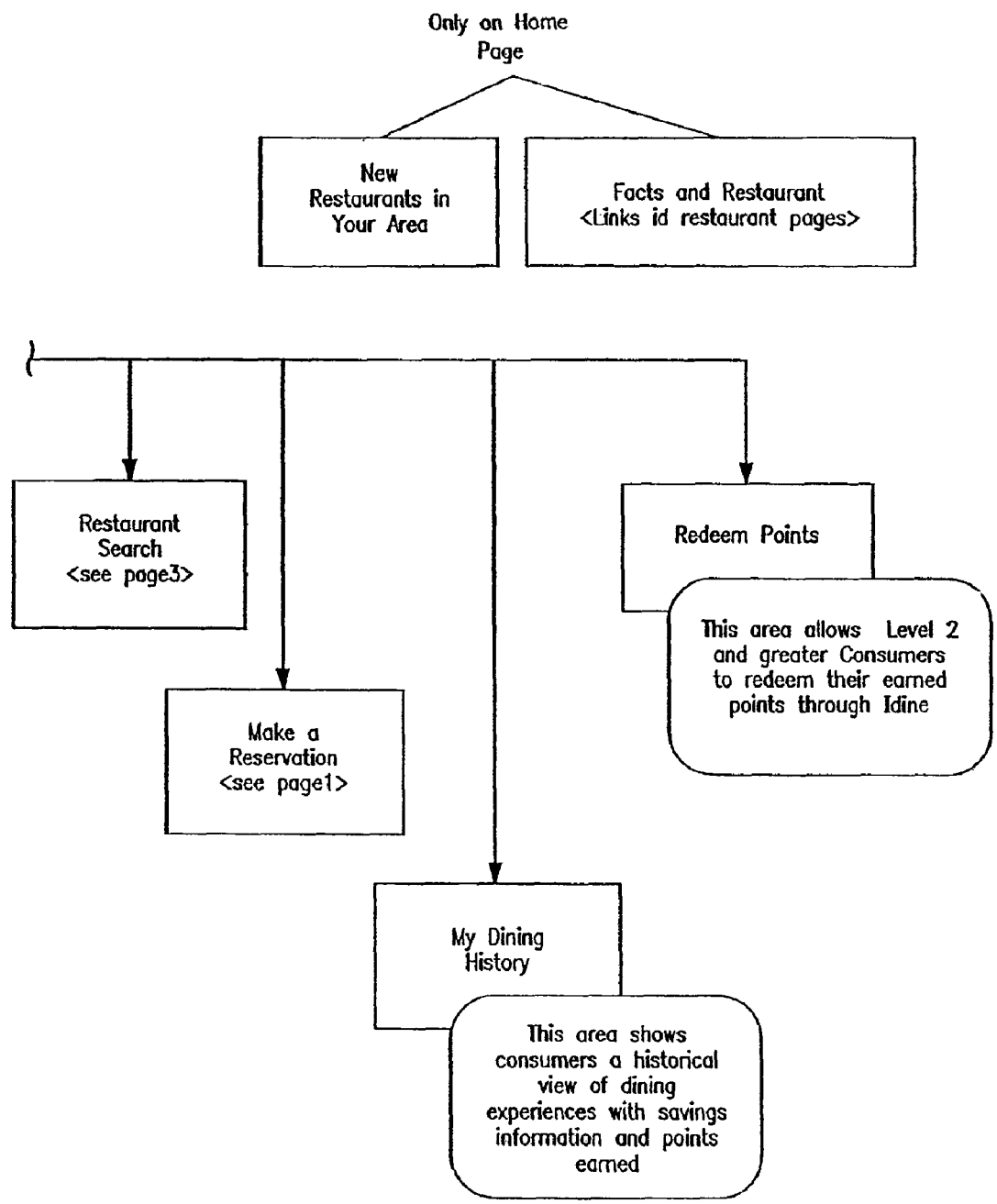
Figures 2, 3E:
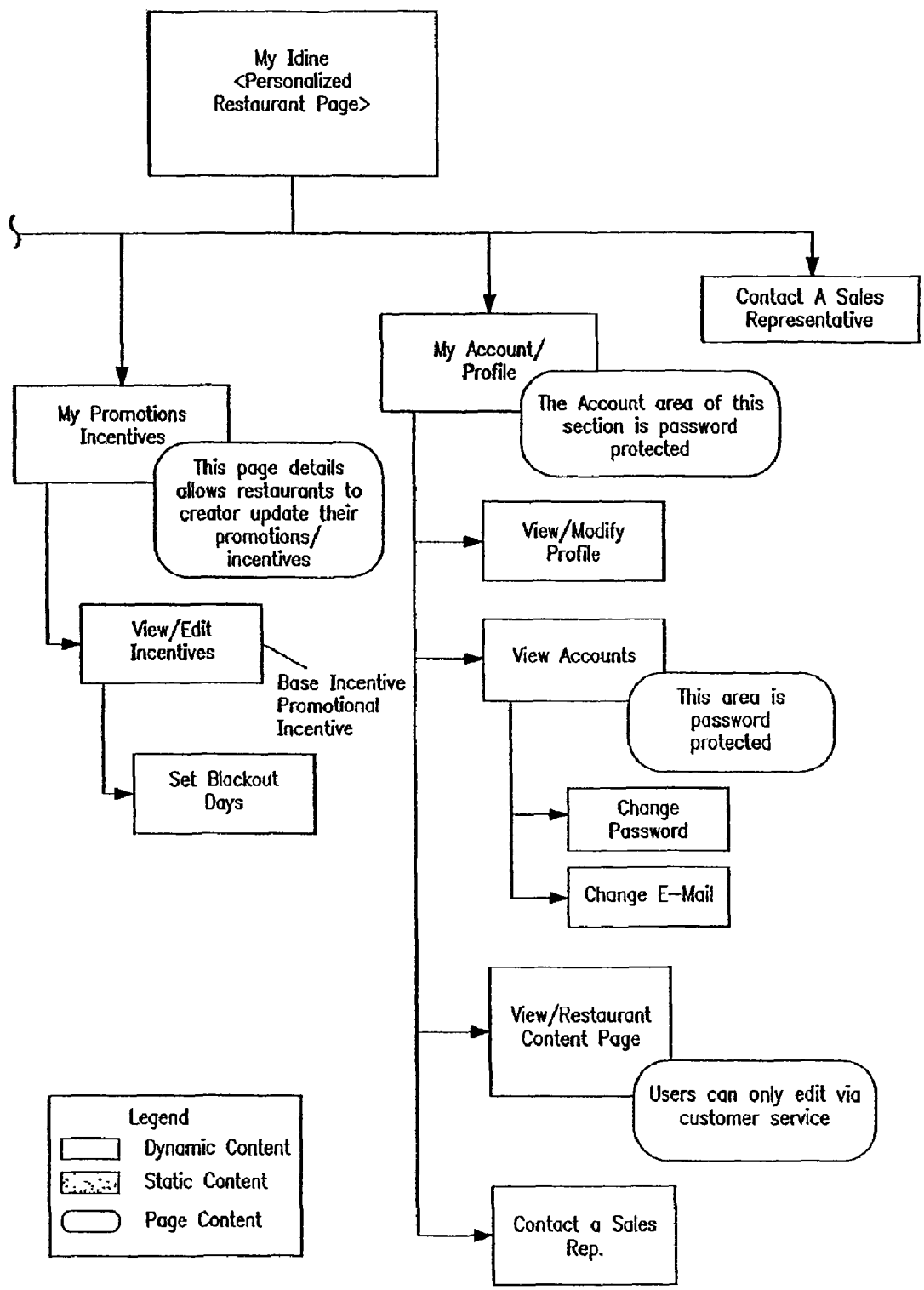

As noted above, the subject system and method allows for a restaurant to set time of day/week/month dining incentives by which the consumer can obtain a reward for dining at an established incentive time. This is particularly advantageous to restaurants as the incentive plan may be used to entice diners at otherwise off-peak demand times within the restaurant. To ensure that the rewards are awarded, as illustrated in FIG. 5, the restaurant notifies the system administrator of the time of day/week/month that the incentive is being offered and the details of the incentive. This information may then be communicated to consumers whereby a consumer can make a reservation through the system to dine at the member restaurant during the specified incentive time.

To determine that the consumer has fulfilled the reservation, the time stamp of the credit card transaction is compared against the time the reservation was made. For day of week or day of month incentives, this comparison need only examine the day field of the credit card transaction record to determine if the reservation was fulfilled during the incentive day. For time of day incentives, the comparison examines the day and time fields of the credit card transaction record to determine if the reservation was fulfilled during the incentive time of the incentive day.

To ensure that the fulfillment took place at approximately the time the reservation was made for time of day incentive plans, a time window is added to the reservation time and the credit card time field is examined to determine if it falls within this time window on the appropriate day. For example, a restaurant can offer incentives to a consumer if the consumer dines at the restaurant between 4 p.m. and 6 p.m. on a Wednesday. If the consumer then makes a reservation for 5 p.m. on Wednesday the consumer is eligible for the incentive and the system will determine that the incentive has been earned if the meal is paid for using the credit card within a predetermined time window on the incentive day (e.g., using a 2 hour window the payment should occur between 5 p.m.-7 p.m. if the reservation time was met by the consumer). It will be appreciated that the time window need not start at the reservation time but can start at some predetermined time after the reservation time. In this manner, the system accounts for the time between the time of reservation and the time of payment, i.e., the time taken to seat the consumer at the restaurant, the time to eat the meal, etc.

While specific embodiments of the invention have been described in detail, it will be appreciated by those skilled in the art that various modifications and alternatives to those details could be developed in light of the overall teachings of the disclosure. For example, all events (such as registration, changing restaurant rewards, changing reservations, making reservations, etc.) need not be performed via a computer network but can be accomplished by placing a phone call, sending a fax, etc. to a representative of the entity that manages the rewards program. This entity can similarly notify the participants by phone, fax, mail, etc. of changes in rewards offered, changes in reservations, to make reservations, etc. In addition, it should be understood by those with skill in the art that the specific web pages provided by the system may change and that specific functionality associated with the web pages may be removed, changed or added Accordingly, the particular arrangement disclosed is meant to be illustrative only and not limiting as to the scope of the invention which is to be given the full breadth of the appended claims and any equivalents thereof.

What is claimed is:

1. A method for allowing member consumers to receive customized benefits associated with an incentive program created by a member business, the method comprising:

accepting via a computer network registration information for a plurality of member consumers entitling the member consumers to benefits of the incentive program, the registration information including credit card indicia for each of the member consumers, and storing the registration information in a database that is in communication with the computer network;

providing to a credit card aggregator credit card transactional information from the member business, the credit card transactional information being comprised of information related to one or more purchases, information about the member business from which the purchase was made, the location of the member business from which the purchase was made, information about the type of products that are sold by the member business, and information about the date and time for the purchase, wherein the information related to one or more purchases includes credit card indicia associated with each of the respective purchases;

receiving credit card transactional information related to the purchases from the aggregator;

comparing credit card transactional information for each one of the purchases with the registration information associated with each of the member consumers;

determining based on the comparison whether the credit card indicia associated with each one of the purchases matches the credit card indicia supplied by one of the member consumers;

rewarding the member consumer associated with the matching credit card indicia in accordance with the benefits of the incentive program;

parsing the credit card transactional information into purchase information comprising categories based on purchase amount, the type of business at which the purchase was made, the location of the business at which the purchase was made, and the date and time that the purchase was made;

storing the purchase information in the database; and providing recommendations to member consumers for other member businesses based on the purchase information that is stored in the database.

2. The method described in claim 1, including the step of providing each of the member consumers with customized home pages based on the credit card purchase information that is stored in the database.

3. The method described in claim 2, wherein the customized home page includes the total number of incentive points, where the benefits rewarded to the member consumer directly related to the incentive points awarded to the member consumer.

4. The method described in claim 3, wherein the incentive points are reward incentives selected from the group consisting of currency, frequent flyer miles, dining points or purchase vouchers.

5. The method described in claim 2, wherein the customized home page displays an account history for the respective member consumer.

6. The method described in claim 1, wherein the recommendations that are provided to member consumers include identifying member businesses that are within a certain distance of the location of the member businesses from which the member consumer has previously made a purchase.

7. The method described in claim 1, wherein the recommendations that are provided to member consumers include identifying member businesses that sell similar products as the member businesses from which the member consumer has made previous a purchase.

8. The method described in claim 7, wherein the products that are sold by member businesses include products selected from the group consisting of food, clothing, articles of manufacture, vehicles, hotel services, or transportation services.

9. The method described in claim 1, wherein the recommendations that are provided to member consumers include identifying member businesses that sell products in similar price ranges.

10. The method described in claim 1, wherein the recommendations that are provided to member consumers include identifying member businesses that are offering specials on selected days of the week or times that correlate to the time purchases by the respective member consumer were made.

11. The method described in claim 1, wherein the credit card indicia is converted into a secure identifier for each of the member consumers by applying a one-way hash algorithm to the credit card indicia for each of the member consumers and thereby generating the secure identifier.

12. The method described in claim 1, wherein credit card indicia may be comprised of information related to a credit card, debit card, or business registered cards for conducting purchase transactions.

* * * * *